US009315678B2

(12) United States Patent
Kitamura et al.

(10) Patent No.: US 9,315,678 B2
(45) Date of Patent: *Apr. 19, 2016

(54) AFFINITY OF HARDLY SOLUBLE OR INSOLUBLE SUBSTANCE SOLVENT BY WATER-SOLUBLE XYLAN

(75) Inventors: Shinichi Kitamura, Osaka (JP); Yoshinobu Terada, Shiga (JP); Takeshi Takaha, Hyogo (JP); Motohide Ikeda, Osaka (JP)

(73) Assignees: Ezaki Glico Co., Ltd., Osaka (JP); Osaka Prefecture University Public Corporation, Osaka (JP)

(*) Notice: Subject to any disclaimer, the term of this patent is extended or adjusted under 35 U.S.C. 154(b) by 1214 days.

This patent is subject to a terminal disclaimer.

(21) Appl. No.: 12/161,371

(22) PCT Filed: Jan. 19, 2007

(86) PCT No.: PCT/JP2007/050843
§ 371 (c)(1),
(2), (4) Date: Sep. 24, 2008

(87) PCT Pub. No.: WO2007/083772
PCT Pub. Date: Jul. 26, 2007

(65) Prior Publication Data
US 2009/0148573 A1    Jun. 11, 2009

(30) Foreign Application Priority Data
Jan. 20, 2006    (JP) .................................. 2006-013020

(51) Int. Cl.
*C08L 5/00* (2006.01)
*C09D 5/24* (2006.01)
(Continued)

(52) U.S. Cl.
CPC . *C09D 5/24* (2013.01); *C08B 1/003* (2013.01); *C08B 37/0003* (2013.01);
(Continued)

(58) Field of Classification Search
CPC .............................. C08L 5/14; C08B 37/0057
See application file for complete search history.

(56) References Cited

U.S. PATENT DOCUMENTS 3,447,940 A    6/1969    Halleck
6,224,931 B1    5/2001    Narimatsu et al.
(Continued)

FOREIGN PATENT DOCUMENTS

EP    1749854 A1 *    2/2007
JP    05-219976    8/1993
(Continued)

OTHER PUBLICATIONS

Saha, "Hemicellulose Bioconversion", Journal of Industrial Microbiology & Biotechnology, vol. 30, pp. 279-291 (2003).*
(Continued)

*Primary Examiner* — Scott R Walshon
(74) *Attorney, Agent, or Firm* — Renner, Otto, Boisselle & Sklar, LLP

(57) ABSTRACT

One object of the present invention is to provide a method of improving the affinity of a solvent for the surface of a hardly soluble or insoluble substances. Further object of the invention is providing a molded article comprising a hardly soluble or insoluble substances using the solution of a hardly soluble or insoluble substances. A method for improving affinity of a substance surface for a solvent, comprising: bringing the substance surface into contact with water-soluble xylan and the solvent, wherein the substance is hardly soluble or insoluble in the solvent in the absence of the water-soluble xylan. A solution comprising an added water-soluble xylan, a substance, and a solvent, wherein the substance is hardly soluble or insoluble in the solvent in the absence of the water-soluble xylan. A molded article comprising the added water-soluble xylan and the hardly soluble substance.

34 Claims, 6 Drawing Sheets

(51) Int. Cl.
    C08L 5/14      (2006.01)
    C08B 37/14     (2006.01)
    C08B 1/00      (2006.01)
    C08B 37/00     (2006.01)
    C08L 3/12      (2006.01)
    C09D 7/12      (2006.01)
    C08K 3/04      (2006.01)

(52) U.S. Cl.
    CPC .......... *C08B 37/0057* (2013.01); *C08B 37/143* (2013.01); *C08L 3/12* (2013.01); *C08L 5/00* (2013.01); *C08L 5/14* (2013.01); *C09D 7/1291* (2013.01); *C08K 3/04* (2013.01)

(56) References Cited

U.S. PATENT DOCUMENTS

| | | | |
|---|---|---|---|
| 7,501,108 | B2 | 3/2009 | Yerushalmi-Rozen et al. |
| 2002/0046872 | A1 | 4/2002 | Smalley et al. |
| 2002/0048632 | A1 | 4/2002 | Smalley et al. |
| 2002/0068170 | A1 | 6/2002 | Smalley et al. |
| 2003/0122111 | A1* | 7/2003 | Glatkowski .................. 252/500 |
| 2004/0186220 | A1 | 9/2004 | Smalley et al. |
| 2008/0242854 | A1* | 10/2008 | Mizu et al. ............... 536/123.12 |
| 2010/0143718 | A1 | 6/2010 | Smalley et al. |

FOREIGN PATENT DOCUMENTS

| | | |
|---|---|---|
| JP | 06-121647 | 5/1994 |
| JP | 10-237107 | 9/1998 |
| JP | 2000-038520 | 2/2000 |
| JP | 2000-139385 A | 5/2000 |
| JP | 2000-139387 A | 5/2000 |
| JP | 2000-157262 | 6/2000 |
| JP | 2000-222550 A | 8/2000 |
| JP | 2000-287630 | 10/2000 |
| JP | 2001-048511 | 2/2001 |
| JP | 2004-082663 A | 3/2004 |
| JP | 2004-506530 A | 3/2004 |
| JP | 2004-531442 A | 10/2004 |
| JP | 2005-013135 A | 1/2005 |
| JP | 2005-014332 | 1/2005 |
| JP | 2005-014332 A | 1/2005 |
| JP | 2005104762 A * | 4/2005 |
| JP | 2005-281672 | 10/2005 |
| JP | 2006-063307 | 3/2006 |
| WO | 02/07869 | 1/2002 |
| WO | WO 2005108482 A1 * | 11/2005 |

OTHER PUBLICATIONS

Machine translation of JP 2000-038520 (2011).*
Ebrignerová et al., "Chemical Modification of Beechwood Xylan with p-Carboxybenzyl Bromide" in Journal of Applied Polymer Sciences vol. 62 (1996), pp. 1043-1047.*
Chen et al., "Noncovalent Functionalization of Carbon Nanotubes for Highly Specific Electronic Biosensors" in Proceedings of the National Academy of Sciences vol. 100 (Apr. 2003), pp. 4984-4989.*
Roubroeks et al., "Contribution of the Molecular Architecture of 4-O-Methyl Glucuonoxylan to its Aggregation Behavior in Solution", Hemicellulose: Science & Technology, ACS Syposium Series pp. 167-183 (Oct. 2003).*
Machine Translation of JP 2006-063307A (2006).*
A. Ebringerova et al., Structure and Properties of Water-Soluble p-Carboxybenzyl Polysaccharide Derivatives, Journal of Applied Polymer Science, 2000, vol. 78, pp. 1191-1199.
A. Ebringerova et al., Water-Soluble p-Carboxybenzylated beechwood 4-$O$-methylglucuronoxylan: structural features and properties, Carbohydrate Polymers, 2000, vol. 42, pp. 123-131.
Betul S. Kayserilioglu et al., Use of xylan, an agricultural byproduct, in wheat gluten based biodegradable films: mechanical, solubility and water vapor transfer rate properties, Bioresource Technology 2003, vol. 87, pp. 239-246.
Anita Teleman et al., Characterization of $O$-acetyl-(4-$O$-methylglucurono)xylan isolated from birch and beech, Carbohydrate Research, 2002, vol. 337, pp. 373-377.

Ikuo Ohara et al., Effects of Modified Rice Bran on Serum Lipids and Taste Preference in Streptozotocin-Induced Diabetic Rate, Nutrition Research, 2000, vol. 20, No. 1, pp. 59-68.
International Search Report for corresponding Application No. PCT/JP2007/050843 dated Apr. 24, 2007.
Form PCT/ISA/237.
Chen et al.; "Solution Properties of Single-Walled Carbon Nanotubes", Science Magazine, Oct. 1998, vol. 282, pp. 95-98 (cited on p. 6 of the specification).
Dalton et al.; "Selective Interaction of a Semiconjugated Organic Polymer with Single-Wall Nanotubes", J. Phys.Chem.B, Oct. 2000, vol. 104, pp. 10012-10016 (cited on p. 6 of the specification).
Chen et al.; "Noncovalent Engineering of Carbon Nanotube Surfaces by Rigid, Functional Conjugated Polymers", J. Am. Chem. Soc., Jul. 2002, vol. 124, pp. 9034-9035 (cited on p. 6 of the specification).
O'Connell et al.; "Reversible water-solubilization of single-walled carbon nanotubes by polymer wrapping", Chemical Physics Letters, Jul. 2001, vol. 342, pp. 265-271 (cited on p. 6 of the specification).
Nakashima et al.; "Water-Soluble Single-Walled Carbon Nanotubes via Noncovalent Sidewall-Functionalization with a Pyrene-Carrying Ammonium Ion", Chemistry Letters, 2002, pp. 638-639 (cited on p. 6 of the specification).
Duesberg et al., "Towards processing of carbon nanotubes for technical applications", Applied Physics A, 1999, vol. 69, pp. 269-274 (cited on p. 6 of the specification).
Dieckmann et al.; "Controlled Assembly of Carbon Nanotubes by Designed Amphiphilic Peptide Helices", J. Am. Chem. Soc., Jan. 2003, vol. 125, pp. 1770-1777 (cited on p. 6 of the specification).
Star et al., "Starched Carbon Nanotubes", Agnew. Chem. Int. Ed., 2002, vol. 41, No. 14, pp. 2508-2512 (cited on p. 6 of the specification).
Lii et al., "Single-walled carbon nanotube-potato amylase complex", Carbohydrate Polymers, 2003, vol. 51, pp. 93-38 (cited on p. 7 of the specification).
Stobinski et al., "Single-walled carbon nanotube-amylopectin complexes", Carbohydrate Polymers, 2003, vol. 51, pp. 311-316 (cited on p. 7 of the specification).
Nakashima et al.; "DNA dissolves Single-walled Carbon Nanotubes in Water", Chemistry Letters, 2003, vol. 32, No. 5, pp. 456-457 (cited on p. 7 of the specification).
Dodziuk et al., "Water solubilization, determination of the number of different types of single-wall carbon nanotubes and their partial separation with respect to diameters by complexation with η-cyclodextrin", ChemCommun., 2003, pp. 986-987 (cited on p. 7 of the specification).
Numata et al., Inclusion of Cut and As-Grown Single-Walled Carbon Nanotubes in the Helical Superstructure of Schizophyllan and Curdlan (β-1,3-Glucans), J. Am. Chem. Soc., 2005, vol. 127, pp. 5875-5884 (cited on p. 7 of the specification).
Maeda, Regioselectivity and stereochemistry of the synthesized sulfated polysaccharides, CACS Forum vol. 18, (Dec. 1998), p. 33-39.
Japanese Office Action for corresponding Japanese Application No. 2007-010854 dated Sep. 6, 2012.
Stobinski et al., Single-walled carbon nanotube-amylopectin complexes, Carbohydrate Polymers, 51(3), p. 311-316, Feb. 15, 2003.
International Search Report for related Application No. PCT/JP2007/050842 dated Feb. 27, 2007.
Takahashi et al., "Dispersion and purification of single wall carbon nanotubes using carboxycellulose", Japanese Journal of Applied Phys., 43, 6A, pp. 3636-3639, Jun. 9, 2004.
Pinto et al., "Chemical composition and structural features of the macromolecular components of plantation Acacia mangium Wood", Journal of Agricultural and Food Chemistry, vol. 53, pp. 7856-7862, Jun. 10, 2008.
Office Action dated Mar. 8, 2011 issued in the related U.S. Appl. No. 12/161,365.
Office Action dated Sep. 20, 2011 issued in the related U.S. Appl. No. 12/161,365.
Office Action dated Aug. 9, 2013 issued in the related U.S. Appl. No. 12/161,365.
Office Action dated Jan. 16, 2014 issued in the related U.S. Appl. No. 12/161,365.
Office Action dated Nov. 7, 2014 issued in the related U.S. Appl. No. 12/161,365.

* cited by examiner

AFFINITY OF HARDLY SOLUBLE OR INSOLUBLE SUBSTANCE SOLVENT BY WATER-SOLUBLE XYLAN

TECHNICAL FIELD

The present invention relates to a method for improving affinity of a solvent for the surface of a substance that is hardly soluble or insoluble in the solvent. The present invention also relates to a solution comprising an added water-soluble xylan, a hardly soluble or insoluble substance, and a solvent. The present invention also relates to a molded article comprising an added water-soluble xylan and a hardly soluble substance. The present invention also relates to a processed grain food to which a water-soluble xylan is added. The present invention also relates to an affinity improver for improving affinity of a substance surface for a solvent. The present invention also relates to a taste improver for improving a taste of food comprising an ingredient imparting an unpleasant taste. The present invention also relates to a method for alleviating an unpleasant taste of food comprising an ingredient imparting the unpleasant taste.

BACKGROUND ART

In the fields of medicines, cosmetics, food, agricultural chemicals, and the like, many useful substances have the property of being hardly soluble in water. Such property limits utilization of the useful substances. In general, a method such as mechanical micronization, addition of a solubilizing agent, or the like is employed in order to solubilize the hardly water-soluble substances. As the solubilizing agent, in many cases, an organic solvent, an emulsifier, a surfactant, cyclodextrin, or the like that is soluble in water is used. However, there are some hardly water-soluble substances that cannot be solubilized with the use of such solubilizing agent.

A carbon nanotube is theoretically expected to have excellent chemical, electronic, and mechanical properties, and these properties have been confirmed by experiments in recent years. There have been studies for using the carbon nanotube for, for example, electron emitting devices, fuel cells, composite materials, semiconductors, a probe for scanning probe microscopes, electromagnetic wave shielding materials, medical materials, and the like by utilizing the excellent properties thereof, and part of the studies have been put into practical use. The carbon nanotube is classified into a single-layer carbon nanotube formed of one graphite layer only and a multilayer carbon nanotube formed of a plurality of graphite layers that are overlapped in the form of coaxial cylinders. Among the carbon nanotubes, the single-layer carbon nanotube is especially insoluble to many solvents, and since the surface thereof has a strong hydrophobicity, it is not soluble to water at all. Such insolubility features largely limit chemical utilization of the carbon nanotubes and the single-layer carbon nanotube in particular, especially when the chemical utilization requires dissolution or dispersion of carbon nanotubes into solvents. As a result, the insolubility features are one of the factors that limit the applicable fields of the carbon nanotubes.

Methods for dispersing the carbon nanotube into a solvent have heretofore been disclosed. One of them is a method of chemically modifying the surface of a carbon nanotube (see Non-Patent Document 1). However, the chemically modified carbon nanotube obtained by this method is different from the carbon nanotube before the chemical modification in chemical, electronic, and mechanical properties due to the chemical modification. Therefore, the inherent excellent properties of the carbon nanotube can not be utilized.

As a method for dispersing a carbon nanotube while maintaining original properties of the carbon nanotube, there is a method of wrapping with a polymer in a non-covalent bonding manner (i.e. polymer wrapping method). Dispersion into an organic solvent employing this method is disclosed in Non-Patent Documents 2 and 3 and the like, and dispersion into water employing this method is disclosed in Patent Document 1 and Non-Patent Document 4.

Further, as to the dispersion into water, there has been disclosed a method of dispersing a carbon nanotube by adsorbing an amphiphatic compound such as a surfactant to a side wall of the carbon nanotube. As for such amphiphatic compound, an amphiphatic ammonium salt compound (Non-Patent Document 5) a surfactant (Non-Patent Document 6), a synthetic peptide (Non-Patent Document 7), cationic lipid and DNA (Patent Document 2), starch (amylose and amylopectin) (Non-Patent Documents 8, 9 and 10), DNA (Non-Patent Document 11), cyclodextrin (Non-Patent Documents 12), β-1,3-glucan (Non-Patent Document 13), and a water-soluble polysaccharide (Patent Documents 3 and 4), for example, have been disclosed.

When eating rice, wheat and buckwheat as well as processed grain foods such as rice, bread, noodle, and the like that are processed foods thereof, starch contained therein is generally gelatinized by generally cooking. The processed grain foods have most preferable physical properties such as color, glossiness, non-stickiness, and the like immediately after cooking, and after that, the physical properties are deteriorated overtime, such as change in color, loss of glossiness on surface, or sticking by increase in adhesion property are caused due to drying, aging of starch, and the like.

It is noted that, as used herein, the term "adhesion" refers to a phenomenon that food materials stick to each other in the processed grain food and it is made uneasy to unstick them. Specifically, it refers to the stickiness of a grain, noodles or skins of grains. More specifically, it refers to the phenomenon that grains of rice becoming hardly separate due to the binding of rice grains, spaghetti becoming hardly separate due to the binding of noodles, a plurality of dumplings becoming hardly separate due to the binding of skins of the plurality of dumplings, and the like. When food materials of the processed grain food are stuck with each other, it becomes difficult to eat the food, and further, the texture of the food is deteriorated, resulting in considerable reduction in food value.

When eating the processed grain food, it is desirable to eat them as soon as possible after cooking, but in the case of the processed grain food that are sold in restaurants, distribution stores, and the like, a longer period of time passes until eating due to the time required for production and distribution. During such time, the processed grain food loses the preferable physical properties of immediately after cooking, and the value of the food is considerably reduced.

Various proposals have been made in order to solve such problems for the processed grain food.

Patent Document 5 describes an non-stickiness improver for a processed grain food including a water-soluble hemicellulose, as well as a processed grain food obtained by adding the non-stickiness improver to a grain food or a processed grain food (e.g. rice or pasta) or by treating its surface with the non-stickiness improver. Patent Document 6 describes a formulation for noodle production containing at least one organic acid or organic acid salt and a water-soluble hemicellulose. Patent Document 7 describes a production method for instant dried noodles characterized in that a noodle is treated before drying with a water-soluble hemicellulose. Patent Document 8 describes a quality improver for a processed grain food characterized by containing a water-soluble hemicellulose and monoglyceride acetate. Patent Document 9 describes a non-stickiness improver obtained by emulsifying a mixture containing oil, a viscous polysaccharide, and a water-soluble hemicellulose. The water-soluble hemicellulose described in Patent Documents 5 to 9 is those obtained from an herbaceous plant such as an oilseed (soybean, palm, corn and cotton seed) and grains (wheat and rice). A main ingredient of the water-soluble hemicellulose of oilseed is a polygalactan in which main chain of it is a polymer of galactose. For example, in Examples of Patent Document 8, a water-soluble hemicellulose whose trade name is Soyafive is used. A main ingredient of Soyafive-S is a polygalactan mainly composed of galactose, galacturonic acid, arabinose, and rhamnose. The structure of the polygalactan is totally different from those of the water-soluble xylan of the present invention.

Patent Document 1: Japanese National Phase PCT Laid-Open Publication No. 2004-506530 (page 2)
Patent Document 2: Japanese Laid-open Patent Document No. 2004-82663 (page 1)
Patent Document 3: Japanese Laid-open Patent Document No. 2005-14332 (page 1)
Patent Document 4: Japanese National Phase PCT Laid-Open Publication No. 2004-531442 (page 2)
Patent Document 5: Japanese Laid-open Patent Document No. 6-121647 (page 2)
Patent Document 6: Japanese Laid-open Patent Document No. 2000-139385 (page 2)
Patent Document 7: Japanese Laid-open Patent Document No. 2000-139387 (page 2)
Patent Document 8: Japanese Laid-open Patent Document No. 2000-222550 (page 2)
Patent Document 9: Japanese Laid-open Patent Document No. 2005-13135 (page 2)
Non-Patent Document 1: "Science", vol. 282, P95 (1998)
Non-Patent Document 2: "J. Phys. Chem. B.", vol. 104, P10012 (2000)
Non-Patent Document 3: "J. Am. Chem. Soc.", vol. 124, P9034 (2002)
Non-Patent Document 4: "Chemical Physics Letters", vol. 342, P265 (2001)
Non-Patent Document 5: "Chemistry Letters", P638 (2002)
Non-Patent Document 6: "Applied Physics A", vol. 69, P269 (1998)
Non-Patent Document 7: "J. Am. Chem. Soc.", vol. 125, P1770 (2003)
Non-Patent Document 8: "Angew. Chem Int. Ed.", vol. 41, P2508 (2002)
Non-Patent Document 9: "Carbohydrate Polymers", vol. 51, P93 (2003)
Non-Patent Document 10: "Carbohydrate Polymers", vol. 51, P311 (2003)
Non-Patent Document 11: "Chemistry Letters", vol. 32, P456 (2003)
Non-Patent Document 12: "Chem. Commun.", P986 (2003)
Non-Patent Document 13: "J. Am. Chem. Soc.", vol. 127, P5875 (2005)

DISCLOSURE OF THE INVENTION

Problems to be Solved by the Invention

In view of environmental influences, compatibility to bodies of living organisms, and the like, water is the most appropriate solvent. A solubilizing agent to be used for dissolving a hardly water-soluble substance is also preferably to be environmentally friendly or compatible to bodies of living organisms. Therefore, the solubilizing agent is preferably to be a natural product or a biodegradable compound. On the other hand, in the case of utilizing a solution in which a hardly water-soluble substance is dissolved or dispersed as a raw material for a molded article such as a film, compatibility of a substance such as polymer to be used for molding with ingredients in the solution and a reduction in mass of hardly water-soluble substance per weight become problematic in many cases. Therefore, the lower the concentration of the solubilizing agent is used for dissolving the hardly water-soluble substance, the larger amount of the hardly water-soluble or water insoluble substance can be dissolved. Since the solubilizing agent effective for solubilization in low concentration is capable of dissolving the hardly water-soluble or insoluble substance that has not been dissolved conventionally, it increases the variety of the substances that can be used for molding, and these hardly water-soluble or insoluble substances can be applied in a wider range.

Among the previously disclosed carbon nanotube solubilizing technologies as discussed above, those that can utilize water as a solvent are the solubilizing technologies using starch (amylose and amylopectin) (Non-Patent Documents 8, 9 and 10), DNA (Non-Patent Document 11), cyclodextrin (Non-Patent Document 12), β-1,3-glucan (Non-Patent Document 13), or a water-soluble polysaccharide (Patent Documents 3 and 4). However, it was found that some of the following problems are encountered in the case of employing these technologies, for example: (1) the amount of a carbon nanotube to be dissolved is small; (2) stability of the aqueous solution is low, and the carbon nanotube deposits over time when the aqueous solution is stored for a long time (e.g. 3 days or more); and (3) the concentration of the solubilizing agent (such as starch for dispersing the carbon nanotube) is high, thereby causing a problem of compatibility with a substance to be used for molding, such as polymer, resulting in failure in obtaining a molded article. These problems are particularly prominent when these technologies are used for dissolving the single-layer carbon nanotube having a high purity.

The present invention is intended to solve these problems, and an object of the present invention is to provide a method for dissolving a hardly soluble or insoluble substance in a solvent at lower concentration of the solubilizing agent as compared to the conventional technologies. An other object of the invention is to provide a method for improving affinity of a solvent for a surface of a hardly soluble or insoluble substance. Yet another object of the present invention is to provide a molded article containing a hardly soluble or insoluble substance by using a solution of the hardly soluble or insoluble substance. In the case where the hardly soluble or insoluble substance is a carbon nanotube, a solution (particularly aqueous solution) in which the carbon nanotube is dissolved at high concentration and with long lasting stability, and a carbon nanotube-containing molded article using the solution, are provided. The technology of the present invention is also applicable for the hardly soluble or insoluble substances other than the carbon nanotube, and particularly, is effectively applicable for hardly water-soluble or water insoluble substances.

Means to Solve the Problems

The present inventors conducted intensive studies in order to solve the aforementioned problems, and, as a result, finally found that the use of a water-soluble xylan is able to improve affinity of a solvent for the surface of a hardly soluble or insoluble substance and have accomplished the present invention based on the findings. Particularly, the present inventors have found that the use of the water-soluble xylan derived from a broad-leaved tree is able to drastically improve the affinity of a solvent to the surface of a hardly water-soluble or water insoluble substance, thereby making it possible to obtain a solution of this substance. The present inventors also have found that the water-soluble xylan has a significant effect of improving the non-stickiness of a processed grain food and a taste improving effect.

To achieve the above objects, the present invention provides, for example, the following means:

Item 1. A method for improving affinity of a substance surface for a solvent, comprising:
bringing the substance surface into contact with water-soluble xylan and the solvent, wherein
the substance is hardly soluble or insoluble in the solvent in the absence of the water-soluble xylan.

Item 2. The method according to Item 1, wherein the number average degree of polymerization of the main chain of said water-soluble xylan is 6 or more and 5,000 or less.

Item 3. The method according to Item 1, wherein said water-soluble xylan consists of:
a xylose residue or acetylated xylose residue;
an arabinose residue; and
4-O-methylglucuronic acid residue.

Item 4. The method according to Item 3, wherein in said water-soluble xylan, the ratio of the total of the xylose residue and the acetylated xylose residue per the arabinose residue is 20 to 100.

Items. The method according to Item 1, wherein said water-soluble xylan consists of:
a xylose residue or acetylated xylose residue; and
4-O-methylglucuronic acid residue.

Item 6. The method according to Item 5, wherein in said water-soluble xylan, a ratio of a total of the xylose residue and the acetylated xylose residue per the 4-O-methylglucuronic acid residue is 1 to 20.

Item 7. The method according to Item 1, wherein the number-average molecular weight of said water-soluble xylan is 7,000 or more and 1,000,000 or less.

Item 8. The method according to Item 1, wherein said water-soluble xylan is derived from woody plants.

Item 9. The method according to Item 8, wherein said water-soluble xylan is derived from hardwood.

Item 10. The method according to Item 1, wherein said contacting step results in a solution in which said substance is solubilized in said solvent.

Item 11. The method according to Item 10, further comprising concentrating said solution.

Item 12. The method according to Item 1, wherein, in said contacting step, an ultra sound is applied to a mixture of said substance, said water-soluble xylan and said solvent.

Item 13. The method according to Item 1, wherein, in said contacting step, said substance is added to a solution containing said water-soluble xylan and said solvent.

Item 14. The method according to Item 1, wherein, in said contacting step, said solvent is added after mixing said water-soluble xylan with said substance.

Item 15. The method according to Item 1, wherein said substance is a carbon nanotube.

Item 16. The method according to Item 15, wherein carbon nanotube is a single-layer carbon nanotube.

Item 17. The method according to Item 1, wherein said substance is a fullerene.

Item 18. The method according to Item 1, wherein said solvent is water.

Item 19. The method according to Item 11, wherein said substance is a carbon nanotube; and the concentration of the carbon nanotube in said solution is 50 mg/L or more.

Item 20. The method according to Item 11, wherein said substance is a carbon nanotube; and the concentration of the carbon nanotube in said solution is 1 g/L or more.

Item 21. The method according to Item 1, wherein said substance is a processed grain food, and the non-stickiness of the processed grain food is improved by said contacting step.

Item 22. The method according to Item 21, wherein said processed grain food is cooked rice.

Item 23. The method according to Item 21, wherein said processed grain food is noodle.

Item 24. The method according to Item 1, wherein said substance is an ingredient imparting an unpleasant taste and the ingredient is contained in a food, and the unpleasant taste of the food is alleviated by the contacting step.

Item 25. The method according to Item 24, wherein said unpleasant taste is bitterness.

Item 26. The method according to Item 24, wherein said food is a tea beverage.

Item 27. A solution comprising an added water-soluble xylan, a substance, and a solvent, wherein the substance is hardly soluble or insoluble in the solvent in the absence of the water-soluble xylan.

Item 28. The solution according to Item 27, wherein the number average degree of polymerization of the main chain of said water-soluble xylan is 6 or more and 5,000 or less.

Item 29. The solution according to Item 27, wherein said water-soluble xylan consists of:
a xylose residue or acetylated xylose residue;
an arabinose residue; and
4-O-methylglucuronic acid residue.

Item 30. The solution according to Item 29, wherein in said water-soluble xylan, the ratio of the total of the xylose residue and the acetylated xylose residue per the arabinose residue is 20 to 100.

Item 31. The solution according to Item 27, wherein said water-soluble xylan consists of:
a xylose residue or acetylated xylose residue; and
4-O-methylglucuronic acid residue.

Item 32. The solution according to Item 31, wherein in said water-soluble xylan, a ratio of a total of the xylose residue and the acetylated xylose residue per the 4-O-methylglucuronic acid residue is 1 to 20.

Item 33. The solution according to Item 27, wherein the number-average molecular weight of said water-soluble xylan is 7,000 or more and 1,000,000 or less.

Item 34. The solution according to Item 27, wherein said water-soluble xylan is derived from woody plants.

Item 35. The solution according to Item 34, wherein said water-soluble xylan is derived from broad-leaved trees.

Item 36. The solution according to Item 27, wherein said substance is a carbon nanotube.

Item 37. The solution according to Item 36, wherein said carbon nanotube is a single-layer carbon nanotube.

Item 38. The solution according to Item 27, wherein said substance is a fullerene.

Item 39. The solution according to Item 27, wherein said solvent is water.

Item 40. The solution according to Item 36, wherein the concentration of the carbon nanotube is 50 mg/L or more.

Item 41. The solution according to Item 36, wherein the concentration of the carbon nanotube is 1 g/L or more.

Item 42. A molded article comprising an added water-soluble xylan and a hardly soluble substance.

Item 43. The molded article according to Item 42, wherein the number average degree of polymerization of the main chain of said water-soluble xylan is 6 or more and 5,000 or less.

Item 44. The molded article according to Item 42, wherein said water-soluble xylan consists of:
 a xylose residue or acetylated xylose residue;
 an arabinose residue; and
 4-O-methylglucuronic acid residue.

Item 45. The molded article according to Item 44, wherein in said water-soluble xylan, the ratio of the total of the xylose residue and the acetylated xylose residue per the arabinose residue is 20 to 100.

Item 46. The molded article according to Item 42, wherein said water-soluble xylan consists of:
 a xylose residue or acetylated xylose residue; and
 4-O-methylglucuronic acid residue.

Item 47. The molded article according to Item 46, wherein in said water-soluble xylan, a ratio of a total of the xylose residue and the acetylated xylose residue per the 4-O-methylglucuronic acid residue is 1 to 20.

Item 48. The molded article according to Item 42, wherein the number-average molecular weight of said water-soluble xylan is 7,000 or more and 1,000,000 or less.

Item 49. The molded article according to Item 42, wherein said water-soluble xylan is derived from woody plants.

Item 50. The molded article according to Item 49, wherein said water-soluble xylan is derived from hardwood.

Item 51. The molded article according to Item 42, wherein said hardly soluble substance is a carbon nanotube.

Item 52. The molded article according to Item 51, wherein said carbon nanotube is a single-layer carbon nanotube.

Item 53. The molded article according to Item 42, wherein said hardly soluble substance is a fullerene.

Item 54. The molded article according to Item 42, wherein said molded article is molded from a solution in which the solvent is water alone.

Item 55. The molded article according to Item 42, wherein said molded article is in the form of a film or a fiber.

Item 56. The molded article according to Item 42, wherein said molded article is a drawn film.

Item 57. The molded article according to Item 42, wherein said molded article is in the form of a gel.

Item 58. The molded article according to Item 42, wherein said molded article is biodegradable.

Item 59. A processed grain food to which a water-soluble xylan is added, wherein the water-soluble xylan consists of a xylose residue or acetylated xylose residue and 4-O-methylglucuronic acid residue.

Item 60. The processed grain food according to Item 59, wherein the processed grain food is cooked rice.

Item 61. The processed grain food according to Item 59, wherein the processed grain food is noodle.

Item 62. The processed grain food according to Item 59, wherein said water-soluble xylan is in contact with the surface of the processed grain food.

Item 63. The processed grain food according to Item 59, wherein the number average degree of polymerization of the main chain of said water-soluble xylan is 6 or more and 5,000 or less.

Item 64. The processed grain food according to Item 59, wherein in said water-soluble xylan, a ratio of a total of the xylose residue and the acetylated xylose residue per the 4-O-methylglucuronic acid residue is 1 to 20.

Item 65. The processed grain food according to Item 59, wherein the number-average molecular weight of said water-soluble xylan is 7,000 or more and 1,000,000 or less.

Item 66. The processed grain food according to Item 59, wherein said water-soluble xylan is derived from woody plants.

Item 67. The processed grain food according to Item 66, wherein said water-soluble xylan is derived from hardwood.

Item 68. An affinity improver for improving affinity of a substance surface for a solvent, wherein the affinity improver comprises a water-soluble xylan, and wherein the substance is hardly soluble or insoluble in the solvent in the absence of the water-soluble xylan.

Item 69. The affinity improver according to Item 68, wherein the number average degree of polymerization of the main chain of said water-soluble xylan is 6 or more and 5,000 or less.

Item 70. The affinity improver according to Item 68, wherein said water-soluble xylan consists of:
 a xylose residue or acetylated xylose residue;
 an arabinose residue; and
 4-O-methylglucuronic acid residue.

Item 71. The affinity improver according to Item 70, wherein in said water-soluble xylan, the ratio of the total of the xylose residue and the acetylated xylose residue per the arabinose residue is 20 to 100.

Item 72. The affinity improver according to Item 68, wherein said water-soluble xylan consists of:
 a xylose residue or acetylated xylose residue; and
 4-O-methylglucuronic acid residue.

Item 73. The affinity improver according to Item 72, wherein in said water-soluble xylan, the ratio of the total of the xylose residue and the acetylated xylose residue per the 4-O-methylglucuronic acid residue is 1 to 20.

Item 74. The affinity improver according to Item 68, wherein the number-average molecular weight of said water-soluble xylan is 7,000 or more and 1,000,000 or less.

Item 75. The affinity improver according to Item 68, wherein said water-soluble xylan is derived from woody plants.

Item 76. The affinity improver according to Item 75, wherein said water-soluble xylan is derived from hardwood.

Item 77. The affinity improver according to Item 68 for use as a solubilizing agent for dissolving a hardly water-soluble substance in a solvent.

Item 78. The affinity improver according to Item 68 for use as a quality improver for a processed grain food.

Item 79. The affinity improver according to Item 68 for use as a non-stickiness improver.

Item 80. A taste improver for improving a taste of a food containing an ingredient imparting an unpleasant taste, wherein the taste improver comprises a water-soluble xylan.

Item 81. The taste improver according to Item 80, wherein said unpleasant taste is bitterness.

Item 82. The taste improver according to Item 80, wherein the number average degree of polymerization of the main chain of said water-soluble xylan is 6 or more and 5,000 or less.

Item 83. The taste improver according to Item 80, wherein said water-soluble xylan consists of:
 a xylose residue or acetylated xylose residue;
 an arabinose residue; and
 4-O-methylglucuronic acid residue.

Item 84. The taste improver according to Item 83, wherein in said water-soluble xylan, the ratio of the total of the xylose residue and the acetylated xylose residue per the arabinose residue is 20 to 100.

Item 85. The taste improver according to Item 80, wherein said water-soluble xylan consists of:
a xylose residue or acetylated xylose residue; and
4-O-methylglucuronic acid residue.

Item 86. The taste improver according to Item 85, wherein in said water-soluble xylan, the ratio of the total of the xylose residue and the acetylated xylose residue per the 4-O-methylglucuronic acid residue is 1 to 20.

Item 87. The taste improver according to Item 80, wherein the number-average molecular weight of said water-soluble xylan is 7,000 or more and 1,000,000 or less.

Item 88. The taste improver according to Item 80, wherein said water-soluble xylan is derived from woody plants.

Item 89. The taste improver according to Item 88, wherein said water-soluble xylan is derived from hardwood.

Item 90. The taste improver according to Item 80, wherein said food contains a bioactive substance; the bioactive substance has bitterness; and the bitterness of the food is alleviated as compared to those in the absence of the water-soluble xylan.

Item 91. The taste improver according to Item 80, wherein said food is a tea beverage.

Effect of the Invention

With the use of an affinity improver of the present invention, it is possible to solubilize a hardly soluble or insoluble substance (e.g. a hardly water-soluble substance) at lower concentration of the affinity improver as compared to the conventional technologies. Therefore, such affinity improver makes it possible to use hardly soluble or insoluble (e.g. a hardly water-soluble) useful substances in the fields of medicines, cosmetics, food, and the like.

Further, according to a preferred embodiment of the present invention, with the use of the solution of the present invention, it is possible to obtain a coating material (excluding aqueous coating material; e.g. solvent-based coating material and the like), a gel, and the like uniformly containing a hardly soluble or insoluble (e.g. hardly water-soluble) substance, and further, it is possible to obtain a molded article such as a film, a fiber, and the like.

According to the method of the present invention, it is possible to obtain a processed grain food that is improved in non-stickiness as compared to conventional products and excellent in mouth-feel after storage.

According to the method of the present invention, it is possible to alleviate an unpleasant taste of food. Particularly, the bitterness of the food containing a bitter component can be alleviated.

BEST MODE FOR CARRYING OUT THE INVENTION

Figure 1:
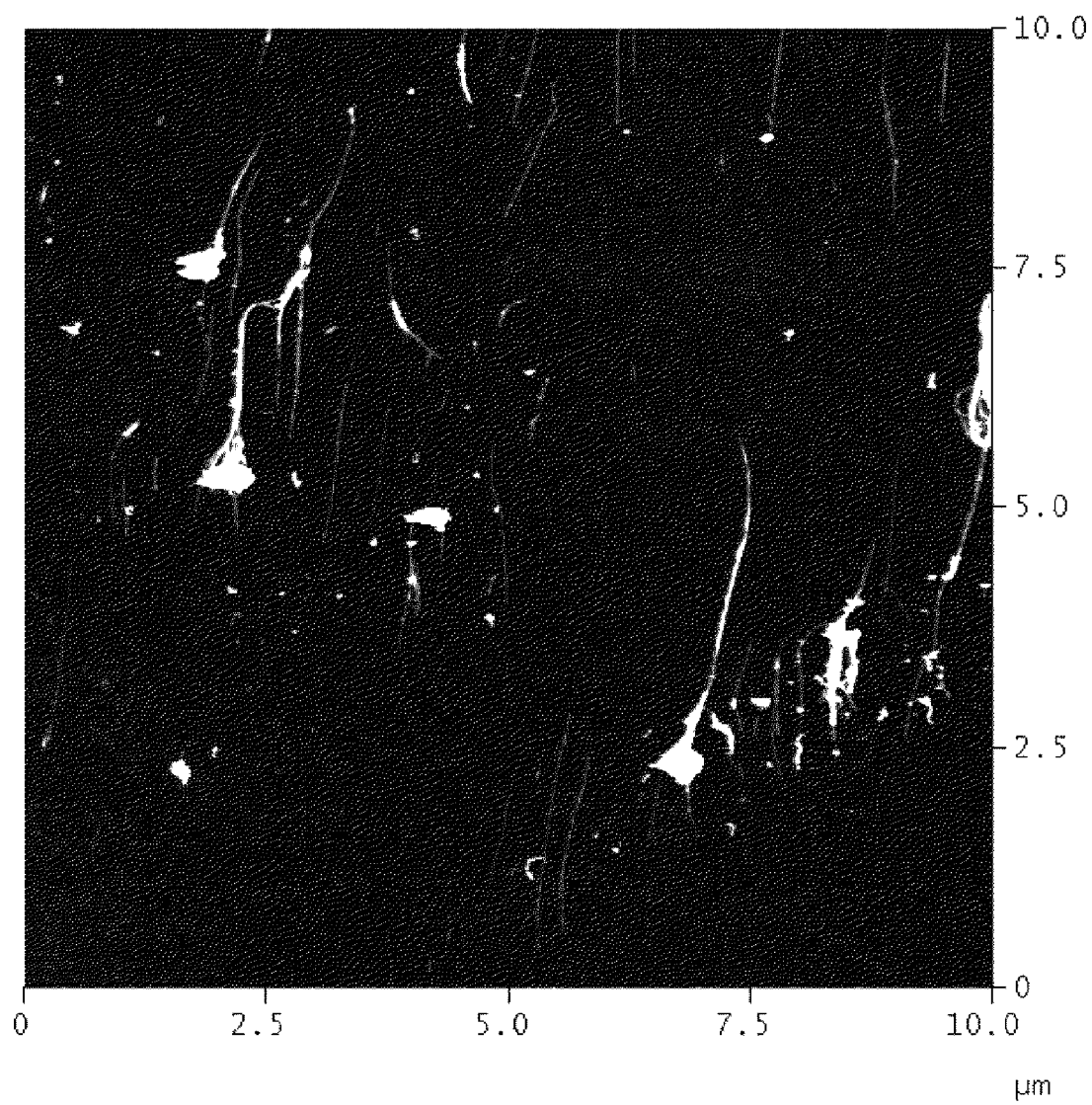
FIG. 1 is an atomic force microscopy image of carbon nanotubes dispersed into a carbon nanotube solution obtained by using glucuronoxylan. The white parts are the carbon nanotubes, and the black parts are the surface of a silicon wafer which is a sample board.

Hereinafter, the present invention will be described in detail. The present invention provides a method for improving affinity of the surface of a substance for a solvent. The present invention also provides a solution comprising an added water-soluble xylan, a substance, and a solvent. The present invention also provides a molded article comprising an added water-soluble xylan and a hardly soluble substance. The present invention also provides a processed grain food to which a water-soluble xylan is added. The present invention also provides an affinity improver for improving affinity of a substance surface for a solvent. The present invention also provides a taste improver for improving the taste of food comprising an ingredient imparting an unpleasant taste. The present invention also provides a method for alleviating an unpleasant taste of food comprising an ingredient imparting the unpleasant taste.

(1. Water-Soluble Xylan)

The term "xylan", as used herein, refers to a molecule having 2 or more xylose residues that are connected to each other by β-1,4 bonds. Herein, in addition to molecules consisting of xylose residues only (i.e., pure xylose polymer), the modified molecules thereof, and molecules in which other residues such as arabinose are bound to pure xylose polymers are also referred to as "xylan". The pure xylose polymers having a degree of polymerization of up to 5 are soluble in water at a concentration of 6 mg/mL or more. However, the solubility in water of pure xylose polymers having a degree of polymerization of 6 or more is less than 6 mg/mL.

The term "water-soluble xylan", as used herein, refers to a molecule having six or more xylose residues that are connected to each other with β-1,4 bonds and being capable to dissolve in water at 20° C. in 6 mg/mL or more. The water-soluble xylan is not pure xylose polymer, but is a molecule in which at least part of hydroxyl groups of the xylose polymer are substituted with other substituents (e.g., acetyl group, glucuronic acid residue, arabinose residue, or the like). When a hydroxyl group of the xylan consisting of xylose residues only is substituted with other substituents, the resultant molecule may have higher water solubility than those of xylans consisting of xylose residues only. The molecule in which a hydroxyl group of the xylan consisting of xylose residues only are substituted with other substituent can be referred to as a molecule in which substituent is bound to a xylose polymer, or a modified xylose polymer. It is noted that the term "modified", as used herein, refers to a molecule modified from a reference molecule, and includes not only artificially produced molecules but also naturally occurring molecules. Molecules in which 4-O-methyl glucuronic acid residues and acetyl groups are bound to xylose polymers are generally called glucuronoxylans. Molecules in which arabinose residues and 4-O-methyl glucuronic acids are bound to xylose polymers are generally called arabinoglucuronoxylans.

The water-soluble xylan preferably comprises only xylose residues or the modification thereof in the main chain, and more preferably only xylose residues or acetylated xylose residues in the main chain. The term "main chain", as used herein, refers to the longest chain in which residues are connected to each other by β-1,4-bonds. When the water-soluble xylan is linear, the molecule itself is the main chain. When the water-soluble xylan is branched, the longest chain connected by β-1,4-bonds is the main chain. The number-average degree of polymerization of the main chain of the water-soluble xylan for use in the present invention is preferably about 6 or more, more preferably about 7 or more, more preferably about 8 or more, particularly preferably about 9 or more, and most preferably about 10 or more. The number-average degree of polymerization of the main chain of the water-soluble xylan for use in the present invention is preferably about 5,000 or less, more preferably about 1,000 or less, more preferably about 500 or less, particularly preferably about 100 or less, and most preferably about 50 or less. The water-soluble xylan having too high number-average degree of polymerization of the main chain may have too low water-solubility.

A hydrophilic group may be bound to any of the position 1, 2, 3 or 4 of the xylose residue. The hydrophilic groups may be bound to all of the four positions of one xylose residue, preferably to three or less positions, more preferably to two or less positions, and most preferably to a single position. The hydrophilic groups may be bound to all xylose residues in the xylose polymer, preferably only to a part of the xylose residues. The ratio of number of the bond of the hydrophilic group is preferably one or more per ten xylose residues, more preferably two or more per ten xylose residues, more preferably three or more per ten xylose residues, particularly preferably four or more per ten xylose residues, and most preferably five or more per ten xylose residues. Examples of the hydrophilic groups include an acetyl group, a 4-O-methyl-α-D-glucuronic acid residue, an L-arabinofuranose residue and an α-D-glucuronic acid residue.

In a particular embodiment of the present invention, a water-soluble xylan in which another saccharide residue is bound to the position 2 of the xylose residue is preferable. As for the ratio of the total of xylose residues and acetylated xylose residues to other saccharide residues in this water-soluble xylan, the total amount of xylose residues and acetylated xylose residues is preferably 20 moles or less, more preferably 10 moles or less, and still more preferably 6 moles or less, with respect to 1 moles of other saccharide residues. As for the ratio of the total of xylose residues and acetylated xylose residues to other saccharide residues, the total amount of the xylose residues and acetylated xylose residues is preferably 1 mole or more, more preferably 2 moles or more, and still more preferably 5 moles or more, with respect to 1 mole of the other saccharide residues.

In a particular embodiment of the present invention, a water-soluble xylan in which α-1,2-bound 4-O-methyl-α-D-glucuronic acid residues is bound to the position 2 of the xylose residues is preferable. As for the ratio of the total of xylose residues and acetylated xylose residues to 4-O-methyl-α-D-glucuronic acid residues in the water-soluble xylan, the total amount of xylose residues and acetylated xylose residues is preferably 100 moles or less, more preferably 50 moles or less, and still more preferably 20 moles or less, with respect to 1 mole of the 4-O-methyl-α-D-glucuronic acid residues. As for the ratio of the total of xylose residues and acetylated xylose residues to 4-O-methyl-α-D-glucuronic acid residues, the total amount of the xylose residues and acetylated xylose residues is preferably 1 mole or more, more preferably 5 moles or more, still more preferably 9 moles or more, still more preferably 10 moles or more, and still more preferably 14 moles or more, with respect to 1 mole of the 4-O-methyl-α-D-glucuronic acid residues.

The number-average molecular weight of the water-soluble xylan is preferably about 1,000,000 or less, more preferably about 500,000 or less, still more preferably about 100,000 or less, particularly preferably about 50,000 or less, and most preferably about 20,000 or less. The number-average molecular weight of the water-soluble xylan is preferably about 1,500 or more, more preferably about 2,000 or more, still more preferably about 4,000 or more, particularly preferably about 5,000 or more, further more preferably about 6,000 or more, and most preferably about 10,000 or more.

The water-soluble xylan preferably used in the present invention is preferably a woody plant-derived xylan. Water-soluble xylans are contained in a plant cell wall part at large amounts. In particular, woods contain large amounts of water-soluble xylans. The structure of the water-soluble xylan varies depending on the kind of the plant from which it is derived. The main component for a hemicellulose contained in broad-leaved woods is known to be glucuronoxylan. The glucuronoxylan contained in broad-leaved woods is often composed of xylose residues, 4-O-methyl glucuronic acids and acetyl groups at a ratio of 10:1:6. It is known that the main component for a hemicellulose contained in needle-leaved woods is glucomannan, and that the needle-leaved woods also contain glucuronoxylan and arabinoglucuronoxylan. It is noted that main chain of glucomannan comprised of mannose and glucose residues, and the ratio of mannose residue to glucose residue is generally 3-4 to 1. The water-soluble xylan for use in the present invention is preferably derived from a broad-leaved wood, more preferably from Siebold's beech, birch, aspen, elm, beech or oak, and is still preferably glucuronoxylan. The hemicellulose component of broad-leaved woods contains the water-soluble xylan for use in the present invention in large amounts. The broad-leaved wood-derived water-soluble xylan is particularly favorable because it contains almost no arabinose residue. As a matter of fact, naturally occurring water-soluble xylan is a mixture of various molecules different in molecular weight. The naturally occurring water-soluble xylan, as long as it exert its advantageous effect, may be used in the state containing contaminants, can be used as a collection of molecules having a broad molecular weight distribution, or used after highly purified as a collection having a narrower molecular weight distribution.

The water-soluble xylan is also contained in needle-leaved woods, herbaceous plants of *Gramineae* such as corn, rice and wheat, and the like, although in small amounts. In water-soluble xylans derived from these plants, other than 4-O-methyl-α-D-glucuronic acid residues, α-L-arabinose residues are covalently bound to the xylose residues. If the α-L-arabinose residue content is too high, the affinity improving effect may not be obtained, and thus, xylan having a high α-L-arabinose residue content is not preferable for the object of the present invention. Hemicelluloses extracted from cereals (wheat and rice) and *Sasa veitchii* are arabinoglucuronoxylans mainly comprised of xylose, 4-O-methyl glucuronic acid and arabinose, and are thus, different from the water-soluble xylan according to the present invention as the content of arabinose is high. Since these arabinoglucuronoxylans have high arabinose contents, its non-stickiness improving effect for processed grain foods is relatively low. Even if the water-soluble xylans is derived from herbaceous plant, it can also be used in the present invention by removing at least a part of the L-arabinose residues of it. The L-arabinose residues can be removed by any known methods such as a chemical or enzymatic method.

In a particular embodiment of the present invention, the water-soluble xylan preferably consists of xylose residues or acetylated xylose residues; arabinose residues; and 4-O-methylglucuronic acid residues. In this embodiment, the total of the xylose residues and acetylated xylose residues is preferably about 7 or more, more preferably about 10 or more, and still more preferably about 20 or more, with respect to one L-arabinose residue in the water-soluble xylan. In this embodiment, the total of xylose residues and acetylated xylose residues is preferably about 100 or less, more preferably about 60 or less, and still more preferably about 40 or less, with respect to one L-arabinose residue in the water-soluble xylan.

The water-soluble xylan is purified, for example, from woods by a known method. The purification methods for water-soluble xylan include, for example, a method which extracts delignified wood as a raw material with about 10% potassium hydroxide solution. The water-soluble xylan may also be obtained by dispersing powdery cellulose produced from woods in water, filtering the solution sequentially through filter paper, 0.45 μm filter, and 0.2 μm filter, and then drying the resulting filtrate.

As for the ratio of the xylose residue to the L-arabinose residue in the water-soluble xylan for use in the present invention, the ratio of the xylose residue is preferably 7 moles or more, more preferably 10 moles or more, and still more preferably 20 moles or more, with respect to 1 mole of the L-arabinose residue. There is no particular upper limit to the ratio of the xylose residues to 1 mole of the L-arabinose residue, and the ratio of the xylose residue is, for example, 100 residues or less, 60 residues or less, 40 residues or less, or the like with respect to 1 mole of the L-arabinose residue.

In a particularly preferable embodiment of the present invention, the water-soluble xylan preferably contains no L-arabinose residue. This water-soluble xylan consists of xylose residues or acetylated xylose residues and 4-O-methyl glucuronic acid residues. In this embodiment, the total ratio of the xylose residues and acetylated xylose residues is preferably about 1 or more, more preferably about or more, more preferably about 9 or more, more preferably about 10 or more, and still more preferably about 14 or more, with respect to one 4-O-methyl glucuronic acid residues in the water-soluble xylan. In this embodiment, the total of the xylose residues and acetylated xylose residues is preferably about 100 or less, more preferably about 50 or less, and more preferably about 20 or less, with respect to one 4-O-methyl glucuronic acid residue in the water-soluble xylan.

(2. Hardly Soluble or Insoluble Substance)

An object of the present invention is to improve the affinity of the surface of a hardly soluble or insoluble substance for a solvent.

As used herein, the term "hardly soluble" refers to a property of a substance wherein only a small amount of the substance can be dissolved into a solvent. For example, "hardly soluble" means that only less than, for example, about 10 g of said substance can be dissolved in one liter of a solvent at a room temperature (about 20° C.). The term "hardly water-soluble" means that only less than, for example, about 10 g of said substance can be dissolved in one liter of water at a room temperature (about 20° C.).

As used herein, the term "insoluble" refers to a property of a substance wherein almost no amount of the substance can be dissolved into a solvent. For example, "insoluble" refers to that only less than, for example, about 1.0 g of said substance can be dissolved in one liter of a solvent at a room temperature (about 20° C.). The term "water insoluble" means that only less than, for example, about 1.0 g of said substance can be dissolved in one liter of water at a room temperature (about 20° C.).

The hardly soluble or insoluble substance may preferably be a molecular substance. The term "molecular substance" means a substance existing by the unit of a molecule that loses properties of the substance when divided further. Substances such as metals are not included in the molecular substance. In general, all bonds between atoms in a molecule of the molecular substance are covalent bonds.

The hardly soluble or insoluble substance can be in various forms, for example, grains such as cooked rice, material mass such as noodles, and the like.

A solvent to which such substance is hardly soluble or insoluble is preferably a solvent in which a water-soluble xylan can be dissolved, more preferably a solvent in which a water-soluble xylan can be dissolved in an amount of about 10 g or more per one litter of the solvent at a room temperature (about 20° C.). Such solvent is preferably water and any organic solvent that is miscible with water, and most preferably water. Examples of the organic solvent include methanol, ethanol, isopropanol, acetone, acetonitrile, propionitrile, tetra hydrofuran, 1,4-dioxane, methyl isobutyl ketone, methyl ethyl ketone, gamma-butyl lactone, propylene carbonate, sulfolane, nitromethane, N, N-dimethyl formamide, N-methyl acetoamide, dimethyl sulfoxide, dimethyl sulfone, N-methyl pyrrolidone, benzene, toluene, xylene, methylene chloride, chloroform, and dichloroethane.

This substance is preferably hardly water-soluble or water insoluble, and more preferably hardly water-soluble.

Examples of the hardly soluble or insoluble substance include a carbon compound, a drug, a food ingredient, and a colorant. As used herein, a carbon compound refers to those forming a compound by binding each of a plurality of carbon atoms by a covalent bond.

Examples of the carbon compound include a carbon nanotube and fullerene. The carbon nanotube may be a single-layer carbon nanotube or a multilayer carbon nanotube.

A carbon nanotube refers to a carbon allotrope in which a plurality of carbon atoms are bound to each other in the cylindrical shape. Any carbon nanotube may be used as the carbon nanotube. Examples of the carbon nanotubes include single-layer carbon nanotubes and multilayer carbon nanotubes, and the coiled derivatives thereof. The single-layer carbon nanotube is a carbon nanotube in which graphite-formed carbon atoms are arranged in a single layer, while the multilayer carbon nanotube is a carbon nanotube in which graphite-formed carbon atoms are arranged in two or more concentric layers. The carbon nanotube for use in the present invention may be a multilayer or single-layer carbon nanotube, but a single-layer carbon nanotube is more preferable. A carbon nanohorn in the form of a carbon nanotube that is closed at one end, a cup-shaped nanocarbon substance having an opening at the head, or a carbon nanotube having openings at both ends may also be used.

The carbon nanotube may be those having any diameter (i.e., external diameter). The diameter of the carbon nanotube is preferably about 0.4 nm or more, more preferably about 0.5 nm or more, more preferably about 0.6 nm or more, more preferably about 1.0 nm or more, and most preferably about 1.2 nm or more. The diameter of the carbon nanotube is preferably about 100 nm or less, more preferably about 60 nm or less, still more preferably about 40 nm or less, still more preferably about 30 nm or less, still more preferably about 20 nm or less, still more preferably about 10 nm or less, still more preferably 5 nm or less, still more preferably about 4 nm or less, still more preferably about 3 nm or less, still more preferably about 2 nm or less, and most preferably about 1.5 nm or less.

In particular, in the case of a single-layer carbon nanotube, the diameter thereof is preferably about 0.4 nm or more, more preferably about 0.5 nm or more, still more preferably about 0.6 nm or more, still more preferably about 1.0 nm or more, and most preferably about 1.2 nm or more. In the case of a single-layer carbon nanotube, the diameter thereof is preferably about 5 nm or less, more preferably about 4 nm or less, still more preferably about 3 nm or less, still more preferably about 2 nm or less, and most preferably about 1.5 nm or less.

In particular, in the case of a multilayer carbon nanotube, the diameter thereof is preferably about 1 nm or more, more preferably about 2 nm or more, still more preferably about 3 nm or more, still more preferably about 4 nm or more, still more preferably about 5 nm or more, still more preferably about 10 nm or more, still more preferably about 20 nm or more, still more preferably about 30 nm or more, still more preferably about 40 nm or more, and most preferably about 60 nm or more. In the case of a multilayer carbon nanotube, the diameter thereof is preferably about 100 nm or less, more preferably about 60 nm or less, still more preferably about 40 nm or less, still more preferably about 30 nm or less, still more preferably about 20 nm or less, and most preferably about 10 nm or less. As used herein, the diameter of the multilayer nanotube refers to the diameter of the outermost carbon nanotube.

The carbon nanotube may be those having any length (i.e., length in the axial direction). The length of the carbon nanotube is preferably about 0.6 μm or more, more preferably about 1 μm or more, still more preferably about 2 μm or more, and most preferably about 3 μm or more. The length of the carbon nanotube is preferably about 1,000 μm or less, more preferably about 500 μm or less, still more preferably about 200 μm or less, still more preferably about 100 μm or less, still more preferably about 50 μm or less, still more preferably about 20 μm or less, still more preferably about 15 μm or less, still more preferably about 10 μm or less, and most preferably about 5 μm or less.

The carbon nanotube for use in the present invention may be a commercially available product or may be produced by any method known in the art. The carbon nanotubes are sold, for example, from Shenzhen Nanotech Port Co., Ltd., CARBON NANOTEHCNOLOGIES INC., SES RESEARCH, Showa Denko K.K., and the like.

Examples of the methods of producing the carbon nanotube include catalytic hydrogen reduction of carbon dioxide, arc discharge method (see e.g., C. Journet et al., Nature (London), 388 (1997), 756), a laser ablation method (see e.g., A. G. Rinzler et al., Appl. Phys. A, 1998, 67, 29), a CVD method, a gas-phase growth method, a HiPco method allowing growth of nanotube in a gas phase by reaction of carbon monoxide under high temperature and high pressure in the presence of an iron catalyst (see e.g., P. Nikolaev et al., Chem. Phys. Lett., 1999, 313, 91) and the like.

The carbon nanotube may be those unpurified or alternatively, those purified by washing, centrifugation, filtration, oxidation, chromatography, or the like. The purified carbon nanotube is preferable. The purity of the carbon nanotube to be used may be arbitrary, but is preferably about 5% or more, more preferably about 10% or more, still more preferably about 20% or more, still more preferably about 30% or more, still more preferably about 40% or more, still more preferably about 50% or more, still more preferably about 60% or more, still more preferably about 70% or more, still more preferably about 80% or more, still more preferably about 90% or more, and most preferably about 95% or more. The higher the purity of carbon nanotube, the more easily its intrinsic functions is exerted. It is noted that the purity of carbon nanotube, as used herein, refers not to the purity of a single kind of carbon nanotube having a particular molecular weight, but to the purity of the carbon nanotube as a whole. That is, when a powder of carbon nanotubes consists of 30% by weight of carbon nanotubes having a particular molecular weight A and 70% by weight of carbon nanotubes having a particular molecular weight B, the purity of the powder is 100%. Of course, the carbon nanotube to be used may be those selected for a particular diameter, a particular length, a particular structure (single layer or multilayer) or the like.

The carbon nanotube for use in the present invention may be those pulverized in a ball-type pulverizer such as ball mill, vibrating mill, sand mill and roll mill, or those shortly cut by chemical or physical treatment.

Fullerene is a closed cage molecule formed by $sp^2$ hybrid carbons that are disposed in a hexagonal shape and a pentagonal shape. Fullerene (e.g. $C_{60}$ or $C_{70}$) has firstly been identified as a closed spheroidal cage that was produced by condensation of evaporated carbon. The number of carbons in a fullerene is usually 60 to 120, specifically, those having the number of carbons of 60, 70, 76, 78, 82, 84, 90, 94, or 96, as well as those having a greater number of carbons have been confirmed. These may be used alone or as a mixture.

The fullerene to be used in the present invention may be those commercially available or those produced by any known method in the art. Fullerene is sold by Frontier Carbon Corporation, for example.

A drug refers to a compound used as a medicine or a pharmaceutical preparation containing the compound. Examples of the drug include corticoids, androgens, estrogens, progestogens, proton pump inhibitors, 5-HT1 antagonists, sympathetic blockers, sympathomimetics, anti-choline agonists, tranquilizers, anti-anxiety agents, antidotes, analgesics, calcium antagonists, antiemetics, pituitary-hypothalamic hormones, anti-Parkinson agents, antihistamines, angiotensin II antagonists, lidocaine, nitroglycerin, neuroquinone antagonists, and the like.

A food ingredient refers to any material used in a food. It is noted that, for convenience, in this specification, the colorant is not included in the food ingredient. Examples of the food ingredient include a bioactive substance, a carbon compound (carbohydrate and fiber), lipid, a protein, an inorganic, a food fiber, and the like, which can be added to food. Examples of the bioactive substance that can be added to food include polyphenols (e.g. catechin, tannin, oolong tea polyphenols, chlorogenic acid, cacao mass polyphenols, flavonoids (e.g. anthocyanin, hesperidin, neohesperidin, rutin, narinegin, quercetin, isoflavone and naringenin)), alkaloids (e.g. capsaicin), acids (e.g. acetic acid, citric acid, malic acid, lactic acid, fumaric acid, tartaric acid and adipic acid), vitamins (vitamin A, vitamin $B_1$, vitamin $B_2$, vitamin $B_6$, vitamin C, vitamin D, vitamin E, nicotinic acid, nicotinic acid amide, and pantothenic acid), and the like. The bioactive substance is preferably catechin, tannin, cacao mass polyphenols, hesperidin, neohesperidin, rutin, or isoflavone, and most preferably catechin.

A colorant refers to an additive to be added for coloring an article (e.g. food or molded material, or the like). For example, those categorized into pigment and dye can be used. Examples of the colorant include gardenia colorants, safflower colorants, turmeric colorants, Monasus colorants, carotenes, annatto colorants, paprika colorants, dunaliella colorants, palm oil colorants, sand alwood colorants, be at red, cochineal colorants, lac colorants, perilla colorants, red cabbage colorants, red radish colorants, purple sweet potato colorants, purple corn colorants, grape skin colorants, grape juice colorants, blueberry colorants, elder berry colorants, chlorophyll, spirulina colorants, cacao colorants, tamarind colorants, persimmon colorants, kaoliang colorants, carbon black colorants, madder colorants, boysenberry colorants, hibiscus colorants, onion colorants, and synthetic food colorants (food yellow No. 4, food yellow No. 5, food red No. 2, food red No. 3, food red No. 40, food red No. 102, food red No. 104, food red No. 105, food red No. 106, food blue No. 1 and food blue No. 2). The colorant may be edible or inedible.

(3. Solvent)

The solvent to be used in the method of the present invention include those capable of dissolving a water-soluble xylan. The solvent is preferably water or any organic solvent that is miscible with water, and most preferably water. Examples of the organic solvent include methanol, ethanol, isopropanol, acetone, acetonitrile, propionitrile, tetra hydrofuran, 1,4-dioxane, methyl isobutyl ketone, methyl ethyl ketone, gamma-butyl lactone, propylene carbonate, sulfolane, nitromethane, N,N-dimethyl formamide, N-methyl acetoamide, dimethyl sulfoxide, dimethyl sulfone, N-methyl pyrrolidone, benzene, toluene, xylene, methylene chloride, chloroform, and dichloroethane.

In the case where water and the organic solvent are mixed, a ratio of the water of the total of the solvent is preferably about 50% by volume or more, preferably about 60% by volume or more, preferably about 70% by volume or more, preferably about 80% by volume or more, preferably about 90 vol. % or more, and most preferably about 95% by volume or more. The organic solvent to be mixed with the water may be one kind or two or more kinds. In view of influences to environment and bodies of living organisms, the solvent is preferably water or is mainly consisting of water. The term "mainly consisting of water" refers to that about 80% by volume or more of the solvent is water.

(4. Method for Improving Affinity of Substance Surface for Solvent)

The method of the present invention is a method for improving affinity of a substance surface for a solvent. The method of the present invention comprises bringing the substance surface into contact with water-soluble xylan and the solvent. Though a detailed theory has not been clarified, the water-soluble xylan acts between the surface of the hardly soluble or insoluble substance and the solvent to improve affinity of the surface of the hardly soluble or insoluble substance for the solvent.

In the case where the hardly soluble or insoluble substance is a molecular substance, this substance is solubilized in this solvent by the step of bringing the substance surface into contact with water-soluble xylan and the solvent. Therefore, in this case, the method of the present invention can be said to be a method for solubilizing a substance. The term "solubilizing" refers to that the hardly soluble or insoluble substance becomes soluble or behaves in the same manner as those of a soluble substance. When the hardly soluble or insoluble substance is solubilized, a solution in which the substance is dissolved in the solvent is obtained. This solution may be used with its original concentration or may be used after concentrated or diluted. For example, after preparing the solution of the hardly soluble or insoluble substance, the solution can be concentrated to prepare a concentrated solution.

In one embodiment, the method of the present invention comprises applying a ultra sound to a mixture of the hardly soluble or insoluble substance (e.g. carbon nanotube), the water-soluble xylan and the solvent.

In another embodiment, the contacting step in the method of the present invention comprises adding the hardly soluble or insoluble substance (e.g. carbon nanotube) to a solution comprising the water-soluble xylan and the solvent.

In another embodiment, in the method of the present invention, after the added water-soluble xylan and the hardly soluble or insoluble substance (e.g. carbon nanotube) are mixed, the solvent is added thereto to obtain a mixture. In this mixture, the water-soluble xylan, this substance and the solvent contact with each other.

The water-soluble xylan to be used in the method of the present invention is as described in the aforementioned "1. Water-soluble Xylan"; the hardly soluble or insoluble substance is as described in the aforementioned "2. Hardly soluble or Insoluble Substance"; and the solvent is as described in the aforementioned "3. Solvent".

One example of a method for preparing a solution in which a carbon nanotube, as an example of the hardly soluble or insoluble substance, is uniformly dissolved will be described. As for other hardly soluble or insoluble substances, this procedure can be performed in the same manner.

A water-soluble xylan solution can be prepared by adding a water-soluble xylan to a solvent. The concentration of the water-soluble xylan in the water-soluble xylan solution can be arbitrarily set, so long as the water-soluble xylan is soluble. The amount of the water-soluble xylan added is those such that the concentration of the water-soluble xylan in the solution obtained preferably about 0.05% by weight or more, more preferably about 0.1% by weight or more, and still more preferably about 0.2% by weight or more. The concentration of the water-soluble xylan in the solution is preferably about 5% by weight or less, more preferably about 2% by weight or less, more preferably about 1.5% by weight or less, and more preferably about 1% by weight or less. For example, it is preferably in an amount to be in a concentration range of about 1% by weight or less. If the concentration of the water-soluble xylan is too high, the amount of the dissolved carbon nanotube may decrease. If the concentration of the water-soluble xylan is too low, the amount of the dissolved carbon nanotube may be too small.

Then, a carbon nanotube is added to the solution containing the water-soluble xylan, to obtain a mixture. The carbon nanotube to be added is preferably in the form of powder. The amount of the carbon nanotube to be added can be arbitrarily set, so long as it is larger than the amount of the carbon nanotube soluble by the method according to the present invention. The amount of the carbon-nanotube to be added may be, for example, about 0.1 part by weight or more, about 0.2 part by weight or more, about 0.5 part by weight or more, about 1 part by weight or more, or about 5 parts by weight or more, with respect to 100 parts by weight of the solution. The amount of the carbon nanotube to be added may be, for example, about 10 parts by weight or less, about 7.5 parts by weight or less, about 5 parts by weight or less, about 3 parts by weight or less, or about 1 parts by weight or less, with respect to 100 parts by weight of the solution.

In the case of using a fullerene in place of the carbon nanotube, the amount of the fullerene to be added can be arbitrarily set, so long as it is larger than the amount of the fullerene soluble by the method of the present invention. The amount of the fullerene to be added may be, for example, about 0.1 parts by weight or more, about 0.2 parts by weight or more, about 0.5 parts by weight or more, about 1 part by weight or more, or about 5 parts by weight or more, with respect to 100 parts by weight of the solution. The amount of the fullerene to be added may be, for example, about 10 parts by weight or less, about 7.5 parts by weight or less, about 5 parts by weight or less, about 3 parts by weight or less, or about 1 part by weight or less, with respect to 100 parts by weight of the solution.

In the case of using a drug in place of the carbon nanotube, the amount of the drug to be added can be arbitrarily set, so long as it is larger than the amount of the drug soluble by the method of the present invention. The amount of drug to be added may be, for example, about 0.1 parts by weight or more, about 0.2 parts by weight or more, about 0.5 parts by weight or more, about 1 part by weight or more, or about 5 parts by weight or more, with respect to 100 parts by weight of the solution. The amount of drug to be added may be, for example, about 10 parts by weight or less, about 7.5 parts by weight or less, about 5 parts by weight or less, about 3 parts by weight or less, or about 1 part by weight or less, with respect to 100 parts by weight of the solution.

In the case of using a food ingredient in place of the carbon nanotube, the amount of the food ingredient to be added can be arbitrarily set, so long as it is larger than the amount of the food ingredient soluble by the method of the present invention. The amount of the food ingredient to be added may be, for example, about 0.1 parts by weight or more, about 0.2 parts by weight or more, about 0.5 parts by weight or more, about 1 part by weight or more, or about 5 parts by weight or more, with respect to 100 parts by weight of the solution. The amount of the food ingredient to be added may be, for example, about 10 parts by weight or less, about 7.5 parts by weight or less, about 5 parts by weight or less, about 3 parts by weight or less, or about 1 part by weight or less, with respect to 100 parts by weight of the solution.

In the case of using a colorant in place of the carbon nanotube, the amount of the colorant to be added can be arbitrarily set, so long as it is larger than the amount of the colorant soluble by the method of the present invention. The amount of the colorant to be added may be, for example, about 0.1 parts by weight or more, about 0.2 parts by weight or more, about 0.5 parts by weight or more, about 1 part by weight or more, or about 5 parts by weight or more, with respect to 100 parts by weight of the solution. The amount of the colorant to be added may be, for example, about 10 parts by weight or less, about 7.5 parts by weight or less, about 5 parts by weight or less, about 3 parts by weight or less, or about 1 part by weight or less, with respect to 100 parts by weight of the solution.

Alternatively, the water-soluble xylan and the carbon nanotube may be premixed, and then the solvent be added thereto, to obtain a mixture. Alternatively, these may be mixed thoroughly by other mechanical means.

Then, the resulting mixture is applied with ultra sound to dissolve the carbon nanotube. The method applying ultra sound is not particularly limited for the conditions such as, a method applying ultra sound, frequency and time so long as it is a method which allows the uniform dissolution of the carbon nanotube in the water-soluble xylan solution. The temperature and pressure when applying the ultra sound are those conditions by which the solution containing the water-soluble xylan and the carbon nanotube remains in the liquid state. For example, the solution containing the water-soluble xylan and the carbon nanotube is placed in a glass container, and using a bath type sonicator, ultra sound is applied to it at room temperature. For example, the rated output of the ultra sound oscillator is preferably about 0.1 W/cm$^2$ or more, more preferably about 0.2 W/cm$^2$ or more, more preferably about 0.3 W/cm$^2$ or more, more preferably about 10 W/cm$^2$ or more, more preferably about 50 W/cm$^2$ or more, and most preferably about 100 W/cm$^2$ or more, per unit bottom area of the ultra sound oscillator. The rated output of the ultra sound oscillator is preferably about 1500 W/cm$^2$ or less, more preferably about 750 W/cm$^2$ or less, more preferably about 500 W/cm$^2$ or less, and most preferably about 300 W/cm$^2$ or less, per unit bottom area of the ultra sound oscillator. The oscillation frequency is preferably about 10 KHz or more, more preferably about 15 KHz or more, and most preferably about 20 KHz or more. The oscillation frequency is preferably used in the range of 20 to 50 KHz. The amplitude is preferably about 20 μm or more, and most preferably about 30 μm or more. The amplitude is preferably about 40 μm or less. In addition, the time period applying ultra sound is preferably about 1 minute to about 3 hours, more preferably about 3 minutes to about 30 minutes. During, before or after applying ultra sound, an agitating machine such as a Vortex mixer, a homogenizer, a spiral mixer, a planetary mixer, a disperser, a hybrid mixer or the like may be used. The temperature of the mixture can be any temperature so long as, at the temperature, the substances to be dissolved does not decompose or denature and the solvent does not vapor in too much. Because the carbon nanotubes and fullerenes are highly heat resistant, in the case where the substance to be dissolved is a carbon nanotube or fullerene, or a substance which is equivalently heat resistant, the temperature of the mixture is for example, about 5° C. or higher, preferably about 10° C. or higher, more preferably about 15° C. or higher, more preferably about 20° C. or higher, and most preferably about 25° C. or higher. The temperature of the mixture is for example about 100° C. or lower, preferably about 90° C. or lower, more preferably about 80° C. or lower, more preferably about 70° C. or lower, and most preferably about 60° C. or lower. In the case where the substance to be dissolved is a heat-labile substance (for example, a drug, a food integrant, a colorant, or the like), the temperature of the mixture is for example, about 5° C. or higher, preferably about 10° C. or higher, more preferably about 15° C. or higher, more preferably about 20° C. or higher, and most preferably about 25° C. or higher. The temperature of the mixture is for example about 80° C. or lower, preferably about 70° C. or lower, more preferably about 60° C. or lower, still more preferably about 50° C. or lower, and most preferably about 40° C. or lower.

After application of ultra sound, the solid matters including the undissolved carbon nanotube in the solution are removed by filtration, centrifugation or the like to obtain a solution in which carbon nanotubes are uniformly dissolved. The method of removing the undissolved solid matters from the solution after application of the ultra sound may be filtration by filter, centrifugation or the like, and is not particularly limited so long as separation between the dissolved carbon nanotube and the undissolved solid matters can be done. In the case of filtration by filter, a filter having a pore size allowing pass of the dissolved carbon nanotube but preventing pass of the undissolved solid matter is used. Preferably used is a filter having a pore size of 1 μm to about several hundreds of μm. In the case of centrifugation, a condition allowing the dissolved carbon nanotube to remain in the supernatant while allowing precipitation of the undissolved solid matter is selected. Preferably, centrifugal force equivalent to 1,000-4,000×g for 5-30 minutes is applied to allow separation. In this way, a solution in which the carbon nanotube is homogeneously dissolved is obtained.

Homogeneous dissolution of the carbon nanotube in solution is confirmed by recovering the carbon nanotube in the carbon nanotube solution by centrifugation or the like, removing the water-soluble xylan present in excess by washing with a solvent, and then using an atomic force microscope. One example of a more specific method is described below in Examples 1-1 and 1-2.

The amount of the carbon nanotube dissolved in the solution can be measured, for example, by recovering the carbon nanotube by centrifugation at 70,000×g for 15 minutes and measuring the weight thereof. Alternatively, as described in the literature "Chem. Commun.", P. 193 (2001), the concentration of the carbon nanotube has quite a high correlation with the absorbance at 500 nm, and the water-soluble xylan has almost no absorption at the wavelength. Thus, the concentration of the carbon nanotube is easily determined by measuring the absorbance of the solution at 500 nm, unless the solution contains any other substances having absorption at around 500 nm. In the case where a hardly soluble or insoluble substance is used as another substance, the method for measuring the concentration of the substance in the solution can be appropriately selected in depending on the substance.

The concentration of the carbon nanotube in the solution can be arbitrarily set, so long as the carbon nanotube can be dissolved. The concentration of carbon nanotube in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of carbon nanotube in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the carbon nanotube contained in the solution of the present invention, so long as the carbon nanotube is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

The concentration of the fullerene in the solution can be arbitrarily set, so long as the fullerene can be dissolved. The concentration of fullerene in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of fullerene in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the fullerene contained in the solution of the present invention, so long as the fullerene is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

The concentration of the drug in the solution can be arbitrarily set, so long as the drug can be dissolved. The concentration of drug in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of drug in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the drug contained in the solution of the present invention, so long as the drug is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

The concentration of the food ingredient in the solution can be arbitrarily set, so long as the food ingredient can be dissolved. The concentration of food ingredient in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of food ingredient in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the food ingredient contained in the solution of the present invention, so long as the food ingredient is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

The concentration of the colorant in the solution can be arbitrarily set, so long as the colorant can be dissolved. The concentration of colorant in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of colorant in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the colorant contained in the solution of the present invention, so long as the colorant is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

As used herein, the solubility is solubility as measured at 20° C.

In one preferred embodiment, the method of the present invention is utilized in the field of food. For example, in the case where the hardly soluble or insoluble substance is a processed grain food, affinity of the surface of the processed grain food for a solvent is improved by the present invention. Examples of the processed grain food include cooked rice and noodles. When the affinity of the surface of the processed grain food for the solvent is improved, the non-stickiness of the processed grain food is improved. Therefore, by the step of bringing the substance surface into contact with the water-soluble xylan and the solvent, the non-stickiness of the processed grain food is improved.

As used herein, the term "processed grain food" refers to a food in which main raw material is selected from grains such as rice, wheat, buckwheat, fox millet, Japanese millet, and corn, and includes foods which are not suitable for eating when it is not cooked, foods which are not flavored or the like but are edible since a part of cooking is performed thereon, and foods which have been cooked. The processed grain food is preferably the cooked food.

As used herein, among the processed grain food, the food that is not suitable for eating as it is not cooked is referred to as uncooked grain food. Examples of the uncooked grain food include foods containing a carbohydrate as a main ingredient and foods including a part containing a carbohydrate as a main ingredient. Examples of such foods include rice, a bread dough, a Japanese wheat noodle dough (including raw noodle and dried noodle), a Japanese vermicelli dough (including raw noodle and dried noodle), a Chinese noodle dough (including raw noodle and dried noodle), a buckwheat noodle dough (including raw noodle and dried noodle), macaroni (including raw and dried macaroni), spaghetti (including raw noodle and dried noodle), a uncooked dumpling, a uncooked shaomai, a uncooked bun, and the like. The uncooked grain food may be in the state of raw, dried, or frozen.

As used herein, the term "cook" refers to heating the uncooked grain food to make the uncooked grain food into an edible state. Such cooking can be performed in accordance with the uncooked grain food to be cooked and with a method well-known in the art.

As used herein, the term "during cooking" refers to a period from the start of heating of grain food to the termination of heating.

As used herein, among the processed grain food, the processed grain foods that are unflavored or the like, but are edible since a part of cooking has been performed thereon, are referred to as half-cooked food. Examples of half-cooked food include Japanese wheat noodle, Japanese vermicelli, Chinese noodle and buckwheat noodle in a state of boiled noodle, retort noodle, or boiled and frozen noodle; retort cooked rice; frozen rice; or the like. The half-cooked grain food is preferably the retort cooked rice.

As used herein, among the processed grain food, the processed grain foods that are cooked and eatable as it is are referred to as cooked grain food. Examples of the cooked grain food include rice, bread, Japanese wheat noodle, Japanese vermicelli, Chinese noodle, buckwheat noodle, macaroni, spaghetti, dumpling, shaomai, bun, and the like. The cooked grain food is preferably cooked rice. The term "cooked" means that a heating process of the cooking process has been performed on the food so that the food is eatable as it is.

By employing the method of the present invention, the affinity of the surface of the processed grain food for the solvent is improved so that the non-stickiness of the food is improved. Assess of whether or not the non-stickiness has been improved is, for example, performed by measuring the compression stress of a sample of the food obtained by adding thereto water-soluble xylan used in the present invention and a compression stress of a sample of the food without addition and then comparing the compression stresses of the samples. If the compression stress of the sample to which water-soluble xylan is added is reduced as compared to the sample without addition, it can be said that the non-stickiness is improved by the addition.

It is possible to add the water-soluble xylan to the processed grain food by any method known in the art, such as direct sprinkling, spraying as being dispersed into a powder such as a sugar and a common salt, and impregnation or spraying as being dissolved into a liquid such as water and soup stock. A method for adding may be such that a total amount of the water-soluble xylan to be used is input into the food at once or that the water-soluble xylan is input by a small batch over time. A timing for adding the water-soluble xylan may be before cooking, during cooking, or after cooking of the processed grain food. During or after the addition, it is preferred that, stirring is performed as necessary, and the water-soluble xylan is uniformly brought into contact with the surface of the whole materials of the food.

The adding step may be performed before or after each of the processed grain food is stuck. In the case of adding after the sticking of food, the water-soluble xylan is preferably dissolved in a solvent such as water and then added. If the adding step is performed before starch on the surface of the processed grain food is transformed into β-starch, the non-stickiness improving effect of the water-soluble xylan is exerted irrelevant to a time passed after the termination of heating to the adding step and a temperature condition at the time point of adding.

In the case of adding the water-soluble xylan to the processed grain food, an amount of the water-soluble xylan to be added is typically about 0.5 part by weight to about 20 parts by weight, preferably about 1.0 part by weight to about 10 parts by weight, more preferably about 1.0 part by weight to about 5.0 parts by weight, with respect to 100 parts by weight of the processed grain food. There are some cases where it is difficult to achieve the non-stickiness improvement effect when the added amount of water-soluble xylan is less than 0.5 part by weight, and there are some cases where problems occurred to the resultant grain food such as a sticky or powdery surface formed thereon when the added amount exceeds 20 parts by weight or more.

(5. Solution containing Added Water-soluble Xylan, Hardly Soluble or Insoluble Substance, and Solvent)

The solution of the present invention contains the added water-soluble xylan, the hardly soluble or insoluble substance, and the solvent. The hardly soluble or insoluble substance contained in the solution of the present invention is a molecular substance.

The concentration of the added water-soluble xylan in the solution can be arbitrarily set as long as the water-soluble xylan can be dissolved. The concentration of the water-soluble xylan in the solution is preferably about 0.05% by weight or more, more preferably about 0.1% by weight or more, and still more preferably about 0.2% by weight or more. The concentration of the water-soluble xylan in the solution is preferably about 5% by weight or less, more preferably about 2% by weight or less, more preferably about 1.5% by weight or less, and more preferably about 1% by weight or less. If the concentration of the water-soluble xylan is too high in the solution, there are some cases where an amount of the dissolved hardly soluble or insoluble substance is reduced. If the concentration of the water-soluble xylan in the solution is too low, there are some cases where the amount of the dissolved hardly soluble or insoluble substance is small.

The water-soluble xylan contained in the solution of the present invention is as described in the aforementioned "1. Water-soluble Xylan"; the hardly soluble or insoluble substance is as described in the aforementioned "2. Hardly soluble or Insoluble Substance"; and the solvent is as described in the aforementioned "3. Solvent".

The concentration of the carbon nanotube in the solution can be arbitrarily set, so long as the carbon nanotube can be dissolved. The concentration of carbon nanotube in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of carbon nanotube in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the carbon nanotube contained in the solution of the present invention, so long as the carbon nanotube is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

The concentration of the fullerene in the solution can be arbitrarily set, so long as the fullerene can be dissolved. The concentration of fullerene in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of fullerene in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the fullerene contained in the solution of the present invention, so long as the fullerene is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

The concentration of the drug in the solution can be arbitrarily set, so long as the drug can be dissolved. The concentration of drug in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of drug in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the drug contained in the solution of the present invention, so long as the drug is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

The concentration of the food ingredient in the solution can be arbitrarily set, so long as the food ingredient can be dissolved. The concentration of food ingredient in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of food ingredient in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the food ingredient contained in the solution of the present invention, so long as the food ingredient is soluble, but it is usually about 100 g/L (about 10.0% by weight) or less, about 70 g/L (about 7.0% by weight) or less, about 50 g/L (about 5.0% by weight) or less, about 40 g/L (about 4.0% by weight) or less, about 30 g/L (about 3.0% by weight) or less, about 20 g/L (about 2.0% by weight) or less, about 15 g/L (about 1.5% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

The concentration of the colorant in the solution can be arbitrarily set, so long as the colorant can be dissolved. The concentration of colorant in the solution is preferably about 30 mg/L (about 0.003% by weight) or more, more preferably about 50 mg/L (about 0.005% by weight) or more, still more preferably about 100 mg/L (about 0.01% by weight) or more, still more preferably about 150 mg/L (about 0.015% by weight) or more, still more preferably about 300 mg/L (about 0.03% by weight) or more, still more preferably about 400 mg/L (about 0.04% by weight) or more, still more preferably about 500 mg/L (about 0.05% by weight) or more, still more preferably about 600 mg/L (about 0.06% by weight) or more, still more preferably about 700 mg/L (about 0.07% by weight) or more, and most preferably about 800 mg/L (about 0.08% by weight) or more. There is some cases where the concentration of colorant in the solution is preferably about 1 g/L (about 0.1% by weight) or more, about 2 g/L (about 0.2% by weight) or more, about 3 g/L (about 0.3% by weight) or more, about 4 g/L (about 0.4% by weight) or more, or about 5 g/L (about 0.5% by weight) or more. There is no upper limit to the concentration of the colorant contained in the solution of the present invention, so long as the colorant is soluble, but it is usually about 100 g/L (about 10.0% by weight) or less, about 10 g/L (about 1% by weight) or less, about 5 g/L (about 0.5% by weight) or less, about 2 g/L (about 0.2% by weight) or less, or about 1 g/L (about 0.1% by weight) or less.

Any substance other than the water-soluble xylan and the hardly soluble or insoluble substance may be contained in the solution of the present invention so long as the substance does not significantly reduce the solubility of the hardly soluble or insoluble substance.

The solution of the present invention may further comprise various known substances such as a raw material of a substrate (such as a film), a pigment, a plasticizer, a solubilizing agent, a coating control agent, a fluidity control agent, a UV absorber, an antioxidant, a preserving-stabilizing agent, an adhesion auxiliary agent, and a thickener, as necessary. The raw material of the substrate such as a film may be a polymer. Examples of such polymer include polyvinyl alcohol, pullulan, dextran, starch (amylose and amylopectin) and starch derivatives, cellulose derivatives (e.g. methylcellulose, carboxymethyl cellulose, hydroxyethyl cellulose, hydroxypropyl cellulose, etc.), polyethylene glycol, polyacrylamide, polyvinyl pyrrolidone, polyacrylic acid, polystyrene sulfonic acid, dimethyl aminoethyl acrylate, dimethyl aminoethyl methacrylate, deoxyribonucleic acid, ribonucleic acid, guar gum, xanthan gum, alginic acid, gum arabic, carrageenan, chondroitin sulfuric acid, hyaluronic acid, curdlan, chitin, chitosan, gelatin, and the like. Other examples of such polymers include amylose. An amount of these substances to be added may be arbitrarily set by those skilled in the art.

The solution of the present invention may further contain an conductive substance for the purpose of further improving conductivity thereof. Examples of the conductive substance include carbon-based substances (e.g. carbon fiber, conductive carbon black, graphite, etc.), metal oxides (e.g. tin oxide, zinc oxide, etc.), metals (e.g. silver, nickel, copper, etc.), and the like. The amount of these substances to be added may be arbitrarily set by those skilled in the art.

The hardly soluble or insoluble substance is dissolved in the solution of the present invention. The phrase "the hardly soluble or insoluble substance is dissolved" refers to that, after the liquid containing the hardly soluble or insoluble substance is centrifuged at 20° C. and 2,200×g for 10 minutes, the hardly soluble or insoluble substance still remains distributed in the entire liquid and no reduction of coloring of liquid conferred by the hardly soluble or insoluble substance, precipitation or the like is observed. The hardly soluble or insoluble substance is dissolved almost as a single molecule in the solution.

For example, in the case of using a carbon nanotube as the hardly soluble or insoluble substance, the carbon nanotube is dissolved into the solution of the present invention. The phrase "the carbon nanotube is dissolved" refers to that, after the liquid containing the carbon nanotube is centrifuged at 20° C. and 2,200×g for 10 minutes, the carbon nanotube still remains distributed in the entire liquid and no reduction of coloring of liquid conferred by the carbon nanotube, precipitation or the like is observed. The carbon nanotube is dissolved almost as a single molecule in the solution.

In the solution of the present invention, the hardly soluble or insoluble substance (e.g. carbon nanotube) is dissolved stably. The phrase "the hardly soluble or insoluble substance is dissolved stably" refers to that, when the solution of the hardly soluble or insoluble substance is left to stand at room temperature (preferably at about 20° C.) for at least 3 days, no reduction of coloring of liquid conferred by the hardly soluble or insoluble substance, precipitation or the like are observed.

The phrase "the carbon nanotube is dissolved stably" refers to that, when the solution of the carbon nanotube is left to stand at room temperature (preferably at about 20° C.) for at least 3 days, no reduction of coloring of liquid conferred by the carbon nanotube, precipitation or the like are observed. Even after the solution of the present invention is left to stand for preferably about 1 week, more preferably about 2 weeks, still more preferably about 3 weeks, and most preferably about 4 weeks, no reduction of coloring of liquid conferred by the hardly-soluble or insoluble substances, precipitation or the like is observed.

It is noted that in this specification, as long as the hardly soluble or insoluble substance is dissolved in a solution as a solute, even when other substances (e.g. pigment, etc.) are not dissolved, the solution is referred to as "a solution". The other substances may be dissolved, precipitated, dispersed, or in the form of a colloid. Examples of the solution in which the other substances are not dissolved include coating materials (except for aqueous coating materials) (e.g. solvent-based coating materials), emulsifiers, dyes, pigments, cements, and the like. It is noted that, as used herein, the solvent-based coating material refers to a coating material in which the ratio of an organic solvent to the total of ingredients in which a resin is dispersed or dissolved (i.e., solvents) in the coating material is about 40% by volume or more of the total volume of water and the organic solvent before mixing. In the case of mixing the water with the organic solvent in the solvent-based coating material, the ratio of the organic solvent of total mediums is preferably about 50% by volume or more, more preferably about 60% by volume or more, more preferably about 70% by volume or more, more preferably about 80% by volume or more, more preferably about 90% by volume or more, and most preferably about 95% by volume or more, of the total of volumes of water and the organic solvent before mixing.

(6. Molded Article Containing Added Water-Soluble Xylan and Hardly Soluble or Insoluble Substance)

The molded article of the present invention contains the added water-soluble xylan and the hardly soluble or insoluble substance. In a preferred embodiment, the molded article of the present invention is formed using a carbon nanotube, a water-soluble xylan, and a polymer as main ingredients. The hardly soluble or insoluble substance contained in the molded article of the present invention is the molecular substance.

The water-soluble xylan contained in the molded article of the present invention is as described in the aforementioned "1. Water-soluble Xylan"; the hardly soluble or insoluble substance is as described in the aforementioned "2. Hardly soluble or Insoluble Substance"; and the solvent is as described in the aforementioned "3. Solvent".

As used herein, the term "polymer" refers to a polymer that does not encompass the intended hardly soluble or insoluble substance and the water-soluble xylan. By containing the polymer, strength, a gas barrier propriety and the like are imparted to the molded article depending on properties of the polymer.

It is preferable that the content of the water-soluble xylan in the molded article is as small as possible, and the content is preferably about 1% by weight or less, more preferably about 0.1% by weight or less, and most preferably about 0.001% by weight or less.

In a specific embodiment, the hardly soluble or insoluble substance in the molded article is a carbon nanotube. In this case, the content of the carbon nanotube in the molded article is preferably about 0.001% by weight or more, more preferably about 0.01% by weight or more, further preferably about 0.05% by weight or more, and most preferably about 0.1% by weight or more. The content of the carbon nanotube in the molded article is preferably about 20% by weight or less, more preferably about 15% by weight or less, and most preferably about 10% by weight or less.

In a specific embodiment, the hardly soluble or insoluble substance in the molded article is a fullerene. In this case, the content of the fullerene in the molded article is preferably about 0.001% by weight or more, more preferably about 0.01% by weight or more, further preferably about 0.05% by weight or more, and most preferably about 0.1% by weight or more. The content of the fullerene in the molded article is preferably about 20% by weight or less, more preferably about 15% by weight or less, and most preferably about 10% by weight or less.

In a specific embodiment, the hardly soluble or insoluble substance in the molded article is a drug. In this case, the content of the drug in the molded article is preferably about 0.001% by weight or more, more preferably about 0.01% by weight or more, further preferably about 0.05% by weight or more, and most preferably about 0.1% by weight or more. The content of the drug in the molded article is preferably about 20% by weight or less, more preferably about 15% by weight or less, and most preferably about 10% by weight or less.

In a specific embodiment, the hardly soluble or insoluble substance in the molded article is a food ingredient. In this case, the content of the food ingredient in the molded article is preferably about 0.001% by weight or more, more preferably about 0.01% by weight or more, further preferably about 0.05% by weight or more, and most preferably about 0.1% by weight or more. The content of the food ingredient in the molded article is preferably about 20% by weight or less, more preferably about 15% by weight or less, and most preferably about 10% by weight or less.

In a specific embodiment, the hardly soluble or insoluble substance in the molded article is a colorant. In this case, the content of the colorant in the molded article is preferably about 0.001% by weight or more, more preferably about 0.01% by weight or more, further preferably about 0.05% by weight or more, and most preferably about 0.1% by weight or more. The content of the colorant in the molded article is preferably about 20% by weight or less, more preferably about 15% by weight or less, and most preferably about 10% by weight or less.

It is noted that, for convenience, in the present specification, the carbon nanotube and the water-soluble xylan is not classified as the "polymer". That is to say, as used herein, the term "polymer" means polymer materials except for the carbon nanotube and the water-soluble xylan.

As the polymer, any polymers that can be used as a material for molded article may be used. In a specific embodiment, the polymer is preferably a polymer that can be dissolved into a solvent that can be dissolved into water, more preferably a water-soluble polymer. Particularly, by using the water-soluble polymer, it is possible to form a molded article in which the carbon nanotube is dispersed (e.g. film) by using water as a sole solvent.

The polymers to be used in the molded article of the present invention include amylose, enzymatically synthesized amylose, pullulan, dextran, starch and its derivatives, cellulose derivatives (for example, methylcellulose, carboxymethyl cellulose, hydroxyethyl cellulose and hydroxypropyl cellulose), deoxyribonucleic acid, ribonucleic acid, guar gum, xanthan gum, alginic acid, gum arabic, carrageenan, chondroitin sulfuric acid, hyaluronic acid, curdlan, chitin, chitosan, gelatin, lactic acid polymers, glycolic acid polymer, and the like and any combination thereof. The enzymatically synthesized amylose refers to a molecule synthesized by enzyme glycogen phosphorylase using glucose-1-phosphate as a raw material, wherein each glucoses are linearly bonded only with α-1,4 bonds.

Further, the polymers to be used in the molded article of the present invention include polyvinyl alcohol, polyethylene glycol, polyacrylamide, polyvinyl pyrrolidone, polyacrylic acid, polystyrene sulfonic acid, dimethyl aminoethyl acrylate, dimethyl aminoethyl methacrylate, poly(methyl methacrylate), polystyrene, polypropylene, nylon, polycarbonate, polyolefin, polyethylene, polyester, polyimide, polyamide, epoxy, a phenol resin, and the like and any combination thereof.

In the case of using a carbon nanotube as the hardly soluble or insoluble substance, the molded article of the present invention may be used in a electromagnetic shielding part for mobile phones, lap top computers, and the like; a radar absorption material for stealth aircrafts; an automobile materials (e.g. body, bumper, window, engine part); an electrode of fuel cells; and a nano-electronics material (memory for new generation computer, display device, etc.), and can be used as a high strength and light weight composite material. The molded article of the present invention can also be used as a film, a fiber, an adhesion layer of a laminated body, a coating, and the like.

In the case of using fullerene as the hardly soluble or insoluble substance, the molded article of the present invention may be used in a electromagnetic shielding part for mobile phones, lap top computers, and the like; a radar absorption material for stealth aircrafts; and a nano-electronics material (a memory for new generation computer, etc.) and can be used as a high strength and light weight composite material. The molded article of the present invention can also be used as a film, a fiber, an adhesion layer of a laminated body, a coating, and the like.

In the case of using a drug having an antibiotic property, a bioactivity, or the like as the hardly soluble or insoluble substance, in accordance with the present invention, it is possible to obtain a molded article having an antibiotic property, a bioactivity, or the like. The molded article of the present invention can also be used as a film, a fiber, an adhesion layer of a laminated body, a coating, and the like.

In the case of using a food ingredient having, for example, bioactivity as the hardly soluble or insoluble substance, in accordance with the present invention, it is possible to obtain a molded article having bioactivity. In the case where the polymer used for molding is edible, the molded article of the present invention can be used as a processed food. The molded article of the present invention can also be used as a film, a fiber, an adhesion layer of a laminated body, a coating, and the like.

In the case of using the colorant as the hardly soluble or insoluble substance, in accordance with the present invention, it is possible to obtain a colored molded article. In the case where the polymer and the colorant used for molding are edible, the molded article of the present invention may be used as a processed food. The molded article of the present invention can also be used as a film, a fiber, an adhesion layer of a laminated body, a coating, and the like.

The molded article of the present invention may further comprise various known substances such as a pigment, a plasticizer, a solubilizing agent, a coating control agent, a fluidity control agent, a UV absorber, an antioxidant, a preserving-stabilizing agent, adhesion auxiliary agent, and a thickener, as necessary. An amount of these substances to be added may be arbitrarily set by those skilled in the art.

The molded article of the present invention may further contain an conductive substance for the purpose of further improving conductivity thereof. Particularly, in the case of using a carbon compound (e.g. carbon nanotube or fullerene) as the hardly soluble or insoluble substance, the molded article of the present invention preferably contains an conductive substance. Examples of the conductive substance include carbon-based substances (e.g. carbon fiber, conductive carbon black, graphite, etc.), metal oxides (e.g. tin oxide, zinc oxide, etc.), metals (e.g. silver, nickel, copper, etc.), and the like. The amount of these substances to be added may be arbitrarily set by those skilled in the art.

The solution obtained by the present invention is characterized in that the hardly soluble or insoluble substance is uniformly dissolved into a solvent. By utilizing the solution, it is possible to obtain the molded article in which the hardly soluble or insoluble substance is uniformly distributed. The molded article of the present invention is preferably formed from a solution wherein only water is used as a solvent. The molded article of the present invention contains added water-soluble xylan and the hardly soluble or insoluble substance. The molded article is produced by adding a polymer (macromolecular material) to the solution and then drying. The molded article of the present invention may have any form. The form of the molded article of the invention may be a film, a fiber, and the like, for example. In a specific embodiment, the molded article of the present invention is preferably in the form of a film or a fiber. The molded article of the present invention may be a solid such as a film or may be a gel. It is possible to obtain a gelled molded article by using a material having a property of forming a gel as the polymer. It is possible to form a gelled molded article by using a gelatinizing agent for gelatinizing the polymer. In a specific embodiment, the molded article of the present invention is preferably in the form of a gel. The molded article in which the predominant polymer is amylose has biodegradability. The biodegradability refers to a substance that can be degraded into small molecules such as water, carbon dioxide, ammonia, and the like due to the action of enzymes synthesized by microorganism or living organisms; or a substance that can be degraded, adsorbed and then assimilated into microorganisms or plants. In a specific embodiment, the molded article of the present invention is preferably biodegradable.

(7. Molding Method)

It is possible to mold the solution of the present invention by using the solution as a molding material and by employing any conventionally known molding method. For example, it is possible to employ various known methods as the molding method of a polymer material, and specific examples thereof include injection molding, extrusion molding, press molding, casting, blow molding, and the like.

In the case of a molding method using a material containing a solvent (e.g. casing, etc.), the solution obtained by the present invention may be used as it is, used after a part of the solvent is removed, or used after the same or another solvent is added. In the case of a molding method using a material substantially free from any solvent (e.g. injection molding, extrusion molding, etc.), the material obtained by removing the solvent of the aforementioned solution containing the water-soluble xylan, the hardly soluble or insoluble substance and the polymer can be used as the material for molding.

A method for preparing a film will be described as one example of a molded article production. A film is prepared by mixing the solution of the hardly soluble or insoluble substance with the polymer and employing a solution casting method or a spin coating method. The film is characterized in that the hardly soluble or insoluble substance is uniformly dissolved and distributed similarly to the solution of the hardly soluble or insoluble substance. By drawing thus obtained film, it is possible to obtain a drawn film. In the case of performing the drawing, it is preferably to mix the solution with the polymer that can endure the drawing. In a specific embodiment, the molded article of the present invention is preferably a drawn film.

(8. Processed Grain Food to which Water-Soluble Xylan is Added)

In the processed grain food of the present invention, the water-soluble xylan is added. The water-soluble xylan to be added to the processed grain food of the present invention is as described in the aforementioned "1. Water-soluble Xylan". Further preferably, the water-soluble xylan is derived from a woody plant, particularly preferably contains almost no arabinose residue, and most preferably does not contain any arabinose residue. In the case of using the water-soluble xylan that does not contain an arabinose residue, properties such as dispersibility and the non-stickiness improvement are more superior. It is noted that when described as "added water-soluble xylan", this water-soluble xylan excludes a xylan that is originally contained in the processed grain food. The processed grain food to which the water-soluble xylan is not added contains almost no water-soluble xylan, and the content of the water-soluble xylan is less than about 0.05% by weight. When the processed grain food to which the water-soluble xylan has not been added is left to stand in water, the water-soluble xylan hardly or never dissolves into the water. Therefore, almost all of the water-soluble xylan contained in the processed grain food to which the water-soluble xylan has been added is those that are added to the processed grain food.

The amount of the water-soluble xylan in the processed grain food of the present invention is preferably about 0.05% by weight or more, more preferably about 0.1% by weight or more, still more preferably about 0.2% by weight or more, and most preferably about 0.5% by weight or more. The amount of water-soluble xylan in the processed grain food of the present invention is preferably about 20% by weight or less, more preferably about 10% by weight or less, more preferably about 5% by weight or less, and most preferably about 1% by weight or less. There are some cases where it is difficult to achieve the non-stickiness improvement effect when the content of water-soluble xylan in the processed grain food is less than 0.05% by weight, and there are some cases where problems occur to the processed grain food such as a sticky or powdery surf ace when the content exceeds 20 parts by weight.

(9. Affinity Improver for Improving Affinity of Substance Surface for Solvent)

The affinity improver of the present invention is an affinity improver for improving affinity of a substance surface for a solvent. The affinity improver of the present invention contains the water-soluble xylan, and this substance is hardly soluble or insoluble for the solvent in the absence of the water-soluble xylan. The water-soluble xylan contained in the affinity improver of the present invention is as described in the aforementioned "1. Water-soluble Xylan". The affinity improver of the present invention may contain a excipient, a bulking agent, and the like, in addition to the water-soluble xylan.

With the use of the affinity improver of the present invention, the water-soluble xylan acts on the substance surface to improve affinity for the solvent, and, in the case where the substance is a sufficiently small molecular substance, the substance is dissolved in the solvent. Therefore, the affinity improver of the present invention may be used as a solubilizing agent.

With the use of the affinity improver of the present invention, it is possible to improve quality of the processed grain food. Therefore, the affinity improver of the present invention may be used as a improver for processed grain food. The improvements achieved by the affinity improver of the present invention are, for example, improvement in non-stickiness of processed grain food, improvement in texture, and the like.

The affinity improver of the present invention may also be used as a physical property improver. With the use of the affinity improver of the present invention, affinity of a hardly soluble or insoluble solvent for a solvent is improved, as a result, the physical property of the hardly soluble or insoluble substance is improved. Therefore, the affinity improver of the present invention may be used as, for example, an adhesive preventing agent, a viscosity reducing agent, or the like.

The affinity improver of the present invention may also be used as an non-stickiness improver. The affinity improver used as the non-stickiness improver may be composed of the above-described water-soluble xylan alone or may contain other components, as necessary. The affinity improver of the present invention may be provided as a composition. The non-stickiness improver may be provided as, for example, a solution to be sprayed. Then on-stickiness improver may also be provided as an instant seasoning food such as a seasoning for Sushi rice, a seasoning for steamed rice, and the like.

In the case where it is used as the non-stickiness improver, the content of the water-soluble xylan contained in the affinity improver of the present invention may be any ratio so long as the ratio is appropriate as to be added to the processed grain food. The content of the water-soluble xylan in the affinity improver is preferably about 1 to about 90% by weight, more preferably about 3 to about 30% by weight, and further preferably about 5 to about 20% by weight, with respect to 1000 of the weight of the affinity improver. There are some cases where it becomes difficult to uniformly mix the non-stickiness improver with the processed grain food when the weight ratio of the water-soluble xylan is too large. When the weight ratio of water-soluble xylan is too small, there are some cases where it can be difficult to achieve the effect of the addition.

In the case where it is used as the non-stickiness improver, the affinity improver of the present invention may contain "seasoning", as necessary. As used herein, the term "seasoning" refers to a material used for adjusting a taste of the food. Any of conventionally known seasonings can be used in the present invention. Specific examples of the seasoning include saccharides except for the water-soluble xylan; salt; vinegar; soy sources; miso (soybean pastes); sauces; dairy products; chemical seasonings; vegetable extracts; fruit extracts; vegetable pastes; fruit pastes; meat extracts; soup stock; curry powders; and the like.

Examples of the saccharides except for the water-soluble xylan include carbohydrates such as monosaccharides, disaccharides, oligosaccharides, sugar alcohols, and the like. The monosaccharide include fructose, glucose, xylose, sorbose, galactose, isomerized sugar, and the like. The disaccharides include maltose, lactose, trehalose, sucrose, isomerized lactose, palatinose, and the like. The oligosaccharides include xylo-oligosaccharides, fructo-oligosaccharides, soy oligosaccharides, isomalto-oligosaccharides, lactosucrose, galacto-oligosaccharides, lactulose, palatinose oligosaccharides, sucro-oligosaccharides, thean-oligosaccharides, sea weed oligosaccharides, and the like. The sugar alcohols include maltitol, xylitol, sorbitol, mannitol, palatinit, and the like.

Examples of the salt include natural salts and purified salts. Examples of the natural salts include a rock salts, Hakata salt, Ako salt, and the like.

Examples of the vinegars include rice vinegars, grain vinegars, fruit vinegars, brewed vinegars, synthetic vinegars, and the like. Examples of the rice vinegars include rice vinegars, brown rice vinegars, and the like. Examples of the grain vinegar include sake-lees vinegars, malt vinegars, and the like. Examples of the fruit vinegars include apple vinegars, wine vinegars, pineapple vinegars, and the like.

Examples of the soy sauce include dark soy sauce, light soy sauce, fish sauce, and the like.

Examples of the miso (soybean paste) include white miso, red miso, Hatch miso, and the like.

Examples of the sauces include Worcestershire sauce.

Examples of the dairy products include skimmed milk powder, a cream, a concentrated whey, butter, and the like.

Examples of the vegetable extract include an onion extract, a Chinese cabbage extract, and the like.

Examples of the vegetable paste include a tomato paste and the like.

Examples of the fruit paste include a peach paste, an apple paste, and the like.

Examples of the meat extract include a beef extract, a pork extract, a chicken extract, and the like.

Examples of the soup stock include dried soup stocks made from bonito, a dried soup stocks made from seaweed, dried soup stocks made from small sardine, and the like.

Examples of the curry powder include any of curry powders that are generally used.

The affinity improver of the present invention may contain "water", as necessary. The water may be any one of soft water, intermediate water, and hard water. Soft water refers to those having a hardness of less than 10°, intermediate water refers to those having a hardness of 10° or more and less than 20°, and hard water refers to those having a hardness of 20° or more. The water is preferably soft water or intermediate water, more preferably soft water.

The affinity improver of the present invention may contain other additives or ingredients, as necessary, so long as the additive or the ingredient does not impair the effect achieved by the water-soluble xylan. Other additives or ingredients include spices, colorants, preservatives, pH stabilizers, amino acids (e.g. sodium glutamate), vegetables, fruits, meats, and the like.

The affinity improver of the present invention may also be used as an emulsifier. In this case, the affinity improver of the present invention can be used for applications that are similar to those of the conventional emulsifiers.

(10. Other Applications)

In the case where the solution of the present invention contains a polymer that is capable of forming a thin film, the solution of the present invention is capable of forming a thin film by applying on the surface of a substrate by a method generally used for application. Particularly, in the case where the solution of the present invention includes a carbon nanotube as the hardly soluble or insoluble substance, the solution is preferably used for the forming a thin film. For example, applying methods such as by a gravure coater, roll coater, curtain flow coater, spin coater, bar coater, reverse coater, kiss coater, fountain coater, rod coater, air doctor coater, knife coater, blade coater, cast coater, screen coater, or the like; a spraying method such as a spray coating by air spraying, airless spraying or the like; and a dipping method such as by dipping or the like may be used.

In the case where the solution of the present invention contains the polymer capable of forming a thin film, the substrate such as polymer compounds, plastics, woods, papers, ceramic fibers, non-woven cloths, carbon fibers, carbon fiber papers, and films thereof, foamed materials, porous membrane, elastomer, glass plates, or the like can be used as the substrate on which the solution of the present invention is applied and formed the thin film. Examples of the polymer compounds, the plastics, and the films include polyethylene, polyvinyl chloride, polypropylene, polystyrene, an ABS resin, an AS resin, a methacryl resin, polybutadiene, polycarbonate, polyarylate, polyvinylidene fluoride, polyester, polyamide, polyimide, polyaramid, polyphenylene sulfide, polyether ether ketone, polyphenylene ether, polyether nitrile, polyamide imide, polyethersulfone, polysulfone, polyetherimide, polybutyleneterephthalate, polyurethane; and films, foams, elastomers thereof; and the like. The surfaces of these polymer films are preferably treated by a Colona surface treatment or a plasma treatment for the purpose of improving adhesion with a thin film since the thin film is to be formed on at least one side of the polymer film.

The solution and the molded article of the present invention can be appropriately used for other applications of the solution and the molded article which contain carbon nanotubes.

(11. Storage Method for Processed Grain Food to which Water-Soluble Xylan is Added)

It is possible to store the processed grain food obtained by adding the water-soluble xylan thereto according to the present invention for a longer period of time as compared to those to which the water-soluble xylan is not added. In this case, the phrase "for a longer period of time" may be 5 minutes to 30 days, 10 minutes to 7 days, 20 minutes to three days, 30 minutes to one day, or one hour to 10 hours, after the termination of addition of the water-soluble xylan.

The processed grain food of the present invention maintains preferable physical properties such as good non-stickiness and excellent texture that lasts for a long time. With such properties, it is possible to provide the processed grain food that are excellent in taste, achieve good non-stickiness that prevents sticking, and have excellent processability such as formation, weighing, and filling into a container.

(12. Taste Improver)

The taste improver of the present invention is those used for improving a taste of food containing an ingredient that imparts an unpleasant taste, and contains the water-soluble xylan. Though the principle has not been clarified in detail, a taste of food is improved by using the water-soluble xylan. The taste improver of the present invention is preferably capable of alleviating bitterness, burned tastes, astringency, harsh tastes, pungent tastes, sour tastes, saltiness, or grassy tastes; more preferably capable of alleviating bitterness, burned tastes, astringency or harsh tastes; and still more preferably capable of alleviating bitterness or burned tastes. Particularly, in the case where the food contains an ingredient exhibiting bitterness, the bitterness of the food is alleviated to improve the taste of the food.

The taste improver of the present invention may consist of the aforementioned water-soluble xylan alone, but may contain other components, as necessary. The taste improver of the present invention may be provided as a composition.

The content of the water-soluble xylan contained in the taste improver of the present invention may be any ratio so long as the content is appropriate to be added to foods.

The taste improver may be a powder or may be a solution. In the case where the taste improver is a powder, the content of the water-soluble xylan in the taste improver is preferably about 10% by weight or more, more preferably about 15% by weight or more, still more preferably about 20% by weight or more, still more preferably about 25% by weight or more, still more preferably about 30% by weight or more, still more preferably about 35% by weight or more, still more preferably about 40% by weight or more, still more preferably about 45% by weight or more, and most preferably about 50% by weight or more, with respect to 100% of the weight of the taste improver. There is no particular upper limit to the content of the water-soluble xylan in the taste improver, and the content may be, for example, about 100% by weight or less, about 95% by weight or less, about 90% by weight or less, about 85% by weight or less, about 80% by weight or less, about 75% by weight or less, about 70% by weight or less, about 65% by weight or less, about 60% by weight or less, or about 55% by weight or less, with respect to 100% by weight of the weight of the taste improver.

In the case where the taste improver is a liquid, the content of the water-soluble xylan in the taste improver is preferably about 0.01% by weight or more, more preferably about 0.05% by weight or more, still more preferably about 0.1% by weight or more, still more preferably about 0.2% by weight or more, still more preferably about 0.5% by weight or more, still more preferably about 1% by weight or more, still more preferably about 2% by weight or more, still more preferably about 5% by weight or more, still more preferably about 7.5% by weight or more, still more preferably about 10% by weight or more, and most preferably about 15% by weight or more, with respect to 100% of the weight of the taste improver. There is no particular upper limit to the content of the water-soluble xylan in the taste improver, and the content may be, for example, about 50% by weight or less, about 40% by weight or less, about 30% by weight or less, about 25% by weight or less, about 20% by weight or less, about 15% by weight or less, or about 10% by weight or less, with respect to 100% by weight of the weight of the taste improver.

In the case where the weight of the water-soluble xylan is too large, there are some cases where it is difficult to uniformly distribute the water-soluble xylan into a food. When the weight of the water-soluble xylan is too small, there are some cases where it is difficult to achieve the effect of the addition.

(13. Taste-Improved Food)

The taste-improved food of the present invention contains a ingredient imparting an unpleasant taste and the added water-soluble xylan, and the taste-improved food is improved in taste as compared with those in the absence of the water-soluble xylan. The improved taste is preferably bitterness, burned tastes, astringency, harsh tastes, pungent tastes, sour tastes, saltiness, or grassy tastes, more preferably bitterns, burned tastes, astringency, or harsh tastes, further preferably bitterns or burned tastes.

The taste-improved food may be a powder, a mass, a gel, or a liquid.

In the case where the taste-improved food is the powder or the mass, the content of the water-soluble xylan in the taste-improved food is preferably about 10% by weight or more, more preferably about 15% by weight or more, further preferably about 20% by weight or more, further preferably about 25% by weight or more, further preferably about 30% by weight or more, further preferably about 35% by weight or more, further preferably about 40% by weight or more, further preferably about 45% by weight or more, and most preferably about 50% by weight or more, with respect to 100% of the weight of the taste-improved food. There is no particular upper limit to the content of the water-soluble xylan in the taste-improved food, and the content may be, for example, about 100% by weight or less, about 95% by weight or less, about 90% by weight or less, about 85% by weight or less, about 80% by weight or less, about 75% by weight or less, about 70% by weight or less, about 65% by weight or less, about 60% by weight or less, or about 55% by weight or less, with respect to 100% by weight of the weight of the taste-improved food.

In the case where the taste-improved food is the gel or the liquid, the content of the water-soluble xylan in the taste-improved food is preferably about 0.01% by weight or more, more preferably about 0.05% by weight or more, further preferably about 0.1% by weight or more, further preferably about 0.2% by weight or more, further preferably about 0.5% by weight or more, further preferably about 1% by weight or more, further preferably about 2% by weight or more, further preferably about 5% by weight or more, further preferably about 7.5% by weight or more, and most preferably about 10% by weight or more, with respect to 100% of the weight of the taste-improved food. There is no particular upper limit to the content of the water-soluble xylan in the taste-improved food, and the content may be, for example, about 10% by weight or less, about 5% by weight or less, about 1% by weight or less, about 0.5% by weight or less, or about 0.1% by weight or less, with respect to 100% by weight of the weight of the taste-improved food.

In the case where the weight ratio of the water-soluble xylan is too large, there are some cases where it can be difficult to uniformly distribute the water-soluble xylan into a food. When the weight ratio of the water-soluble xylan is too small, there are some cases where it can be difficult to achieve the taste improvement effect of the addition.

The taste-improved food of the present invention may contain various bioactive substances. For example, the bioactive substances such as polyphenols, vitamins, peptides, minerals, and acetic acid are known to have various physiological functions. For example, polyphenols are a collective term for plant components having a plurality of phenolic hydroxy groups in one molecule, are contained in various plants, and are substances excellent in antioxidation capability. Polyphenols have various bioactivities and are utilized for various applications such as medicines and foods. Among polyphenols, particularly, studies concerning to catechin and flavonoids have actively been conducted. Catechin is known to have a bacteriostatic action and body fat reducing action. Flavonoids are known to have, for example, the following bioactivities: blood pressure effecting action (hesperidin and rutin), anti-allergic action (hesperidin), blood cholesterol value improving action (hesperidin), anti-cancer action (hesperidin), anti-mutagenicity (naringenin), cell proliferation suppressing action (naringenin), muscle contraction promoting action (naringenin), intestinal tract movement inhibiting action (naringenin), and calcium entry inhibiting action (naringenin). However, these substances have a low solubility in water. Furthermore, since these substances often have a unique taste, it is difficult to intake these substances orally. For example, since catechin has unique bitterness, it is difficult to intake large amount of catechin orally. Capsaicin is said to be effective in body fat burning, but it is difficult to intake a large amount of capsaicin orally due to its unique pungent taste.

Examples of the bioactive substance to be contained in the taste-improved food of the present invention include polyphenols (e.g. catechin, tannin, oolong tea polyphenols, chlorogenic acid, cacao mass polyphenols, flavonoids (e.g. anthocyanin, hesperidin, neohesperidin, rutin, naringin, quercetin, isoflavone, and naringenin)), alkaloids (e.g. capsaicin), acid (e.g. acetic acid, citric acid, malic acid, lactic acid, fumaric acid, tartaric acid and adipic acid), vitamins (vitamin A, vitamin $B_1$, vitamin $B_2$, vitamin $B_6$, vitamin C, vitamin D, vitamin E, nicotinic acid, nicotinic acid amide, and pantothenic acid), and the like. The bioactive substance is preferably catechin, tannin, cacao mass polyphenol, hesperidin, neohesperidin, rutin, or isoflavone, and most preferably catechin.

The taste-improved food of the present invention comprises these bioactive substances in a larger amount than those of the ordinary food in the absence of the water-soluble xylan, and the amount thereof is preferably about 1.5 times or more, more preferably about twice or more, more preferably about thrice or more, more preferably about 5 times or more, and most preferably 10 times or more of an ordinary upper limit.

In the case where the taste-improved food is the powder or the mass, the content of the bioactive substance in the taste-improved food is preferably about 0.01% by weight or more, more preferably about 0.05% by weight or more, further preferably about 0.1% by weight or more, further preferably about 0.2% by weight or more, further preferably about 0.5% by weight or more, further preferably about 1% by weight or more, further preferably about 2% by weight or more, further preferably about 5% by weight or more, further preferably about 7.5% by weight or more, further preferably about 10% by weight or more, and most preferably about 15% by weight or more, with respect to 100% of the weight of the taste-improved food. There is no particular upper limit to the content of the bioactive substance in the taste-improved food, and the content may be, for example, about 50% by weight or less, about 40% by weight or less, about 30% by weight or less, about 25% by weight or less, about 20% by weight or less, about 15% by weight or less, or about 10% by weight or less, with respect to 100% by weight of the weight of the taste-improved food.

In the case where the taste-improved food is the gel or the liquid, the content of the bioactive substance in the taste-improved food is preferably about 0.01% by weight or more, more preferably about 0.05% by weight or more, further preferably about 0.1% by weight or more, further preferably about 0.2% by weight or more, further preferably about 0.5% by weight or more, further preferably about 1% by weight or more, further preferably about 2% by weight or more, further preferably about 5% by weight or more, further preferably about 7.5% by weight or more, further preferably about 10% by weight or more, and most preferably about 15% by weight or more, with respect to 100% of the weight of the taste-improved food. There is no particular upper limit to the content of the bioactive substance in the taste-improved food, and the content may be, for example, about 50% by weight or less, about 40% by weight or less, about 30% by weight or less, about 25% by weight or less, about 20% by weight or less, about 15% by weight or less, or about 10% by weight or less, with respect to 100% by weight of the weight of the taste-improved food.

The taste-improved food of the present invention is preferably a beverage, more preferably a tea beverage. Examples of the tea beverage is a non-fermented tea (e.g. green tea), a semi-fermented tea (e.g. oolong tea), or a fermented tea (e.g. black tea). Examples of the green tea include sencha (Japanese green tea), bancha (common tea), hojicha (roasted tea), gyokuro, and matcha (powdered green tea). In the case of tea beverage, catechin is the cause of the bitterness, and the bitterness of catechin is considered to be suppressed by the water-soluble xylan.

The taste-improved food of the present invention preferably contains a bioactive substance, and the bioactive substance has a bitter taste. In this case, the bitter taste of the food of the present invention is alleviated as compared to those in the absence of the water-soluble xylan.

The taste-improved food of the present invention preferably contains a bioactive substance, and the bioactive substance has pungent tastes. In this case, the pungent taste of the food of the present invention is alleviated as compared to those in the absence of the water-soluble xylan.

The taste-improved food of the present invention preferably contains a bioactive substance, and the bioactive substance has saltiness. In this case, the saltiness of the food of the present invention is alleviated as compared to those in the absence of the water-soluble xylan.

The taste-improved food of the present invention preferably contains a bioactive substance, and the bioactive substance has sour tastes. In this case, the sour taste of the food of the present invention is alleviated as compared to those in the absence of the water-soluble xylan.

The taste-improved food of the present invention preferably contains a bioactive substance, and the bioactive substance has burned tastes. In this case, the burned taste of the food of the present invention is alleviated as compared to those obtained in the absence of the water-soluble xylan.

The taste-improved food of the present invention preferably contains a bioactive substance, and the bioactive substance has astringency. In this case, the astringency of the food of the present invention is alleviated as compared to those in the absence of the water-soluble xylan.

The taste-improved food of the present invention preferably contains a bioactive substance, and the bioactive substance has harsh tastes. In this case, the harsh taste of the food of the present invention is alleviated as compared to those in the absence of the water-soluble xylan.

The taste-improved food of the present invention preferably contains a bioactive substance, and the bioactive substance has grassy tastes. In this case, the grassy taste of the food of the present invention is alleviated as compared to those in the absence of the water-soluble xylan.

(14. Taste Improving Method)

The taste improving method of the present invention is a method for alleviating an unpleasant taste of food containing a ingredient imparting the unpleasant taste. Though the principle has not been clarified in detail, when the surface of the ingredient imparting an unpleasant taste is brought into contact with the water-soluble xylan, the affinity of the surface of the ingredient for a solvent is improved, and as a result, an unpleasant taste of food containing the ingredient is alleviated. In one embodiment, the taste improving method of the present invention includes a method for adding the water-soluble xylan to food containing a ingredient imparting an unpleasant taste. The taste improving method of the present invention is particularly effective when the food contains a bitter substance. The water-soluble xylan to be used in the present invention is as described in the aforementioned "1. Water-soluble Xylan".

The water-soluble xylan may be added as a powder or in a state of being dissolved in an aqueous solution. Since the water-soluble xylan is easy to be blended with food uniformly, it is preferably to add the water-soluble xylan as the aqueous solution.

The food to be improved in taste generally is a food exhibiting bitterness, a burnt taste, astringency, harsh tastes, pungent tastes, sour tastes, saltiness, grassy tastes, or the like. These tastes become the unpleasant taste when they are excessive. These tastes are alleviated by employing the method of the present invention.

In the case where the food to be improved in taste is a powder or a mass, the amount of the water-soluble xylan to be added in the present invention is adjusted such that the content of the water-soluble xylan in the resultant taste improved food is preferably about 10% by weight or more, more preferably about 15% by weight or more, further preferably about 20% by weight or more, further preferably about 25% by weight or more, further preferably about 30% by weight or more, further preferably about 35% by weight or more, further preferably about 40% by weight or more, further preferably about 45% by weight or more, and most preferably about 50% by weight or more, with respect to 100% of the weight of the taste-improved food. There is no particular upper limit to the amount of the water-soluble xylan to be added, and the amount may be, for example, about 100% by weight or less, about 95% by weight or less, about 90% by weight or less, about 85% by weight or less, about 80% by weight or less, about 75% by weight or less, about 70% by weight or less, about 65% by weight or less, about 60% by weight or less, or about 55% by weight or less, with respect to 100% by weight of the weight of the resultant taste-improved food.

In the case where the food to be improved in taste is a gel or a liquid, the amount of the water-soluble xylan to be added in the present invention is adjusted such that the content of the water-soluble xylan in the resultant taste improved food is preferably about 0.01% by weight or more, more preferably about 0.05% by weight or more, further preferably about 0.1% by weight or more, further preferably about 0.2% by weight or more, further preferably about 0.5% by weight or more, further preferably about 1% by weight or more, further preferably about 2% by weight or more, further preferably about 5% by weight or more, further preferably about 7.5% by weight or more, further preferably about 10% by weight or more, and most preferably about 15% by weight or more, with respect to 100% of a weight of the taste-improved food. There is no particular upper limit to the amount of the water-soluble xylan to be added, and the amount may be, for example, about 10% by weight or less, about 5% by weight or less, about 1% by weight or less, about 0.5% by weight or less, or about 0.1% by weight or less, with respect to 100% by weight of the weight of the resultant taste-improved food.

In the taste improving method of the present invention, the water-soluble xylan may be added at a production step of or after the completion of the food to be improved in taste. It is preferable to add the water-soluble xylan at the production step.

EXAMPLES

Hereinafter, the present invention will be described further in detail by Examples. The present invention is not limited to the following Examples.

Example 1-1

Preparation of Carbon Nanotube Solution

As water-soluble xylan, glucuronoxylan (manufactured by Institute of Chemistry, Slovak Academy of Sciences; the number average molecular weight: 18,000; xylose residue: 4-O-methyl-D-glucuronic acid reside=10:1; no acetylation; derived from beech) was used. To 1 L of a 0.4 mg/mL glucuronoxylan aqueous solution, 2 g of a single-layer carbon nanotube powder (SWCNT-1 manufactured by Shenzhen Nanotech Port Co., Ltd.) was added, and then stirred with a magnetic stirrer. The mixture was sequentially applied ultra sound by an ultra sound dispersing machine (Model UH-600SR, HO-F36 flanged chip, RD-36 continuous holder; manufactured by SMT Co., Ltd.) at a room temperature (15° C. to 20° C.) for 130 minutes at a flow rate of 1 L/min to dissolve and disperse the carbon nanotube. The obtained solution was centrifuged at 2,200×g for 15 minutes, and then collected the supernatant. The supernatant was a blackish solution. The obtained blackish solution had an absorbance at 500 nm of 7.57 and contained about 282 μg/mL of the carbon nanotube.

The obtained solution was centrifuged at 70,000×g for 10 minutes to collect the carbon nanotube as a precipitate. To the obtained precipitate, 50 mL of the aforementioned glucuronoxylan aqueous solution was added, and the carbon nanotube was dispersed by applying an ultra sound at a room temperature (15° C. to 20° C.) for 5 minutes with a bath type sonicator (Branson 1200). The obtained blackish solution had an absorbance at 500 nm of 122 and contained about 4.5 mg/mL of carbon nanotube.

The obtained solution was observed with an atomic force microscope, and it was observed that a single-layer carbon nanotube having an outer diameter of 0.6 to 4.4 nm and a length of 0.5 to 4.5 μm is dispersed as a single molecule in the solution (FIG. 1).

Preparative Example 1

Preparation of Water-Soluble Xylan Aqueous Solution

To 800 g of a commercially available powdery cellulose produced from wood pulp (KC Flock of Nippon Paper Chemicals Co., Ltd.), 20 L of water was added and stirred at room temperature for 30 minutes. The solution was filtered sequentially through filter paper, 0.45 μm filter, and 0.2 μm filter, and the filtrate was recovered as a water-soluble xylan solution. As measured by a phenol sulfuric acid method, the solution obtained contained about 0.45 mg/mL of the water-soluble xylan. The solution was dried to obtain about 9 g of a xylan powder.

The molecular weight of the water-soluble xylan obtained was measured by a gel filtration/multi-angle light scattering method. Measurement was carried out by using gel filtration columns Shodex SB802 M and SB806 M at a column temperature of 40° C., an eluent of 0.1 M sodium nitrate, and a flow rate of 1 mL/min. As the detectors, a differential refractometer Shodex RI-71 (manufactured by Showa Denko K.K.) and a multi-angle light scattering detector DAWN-DSP (manufactured by Wyatt Technology Corp.) were used. The results of the measurements showed that the weight-average molecular weight of the water-soluble xylan obtained was 6,100 and the number-average molecular weight of the water-soluble xylan obtained was 7,500.

Figure 2A:
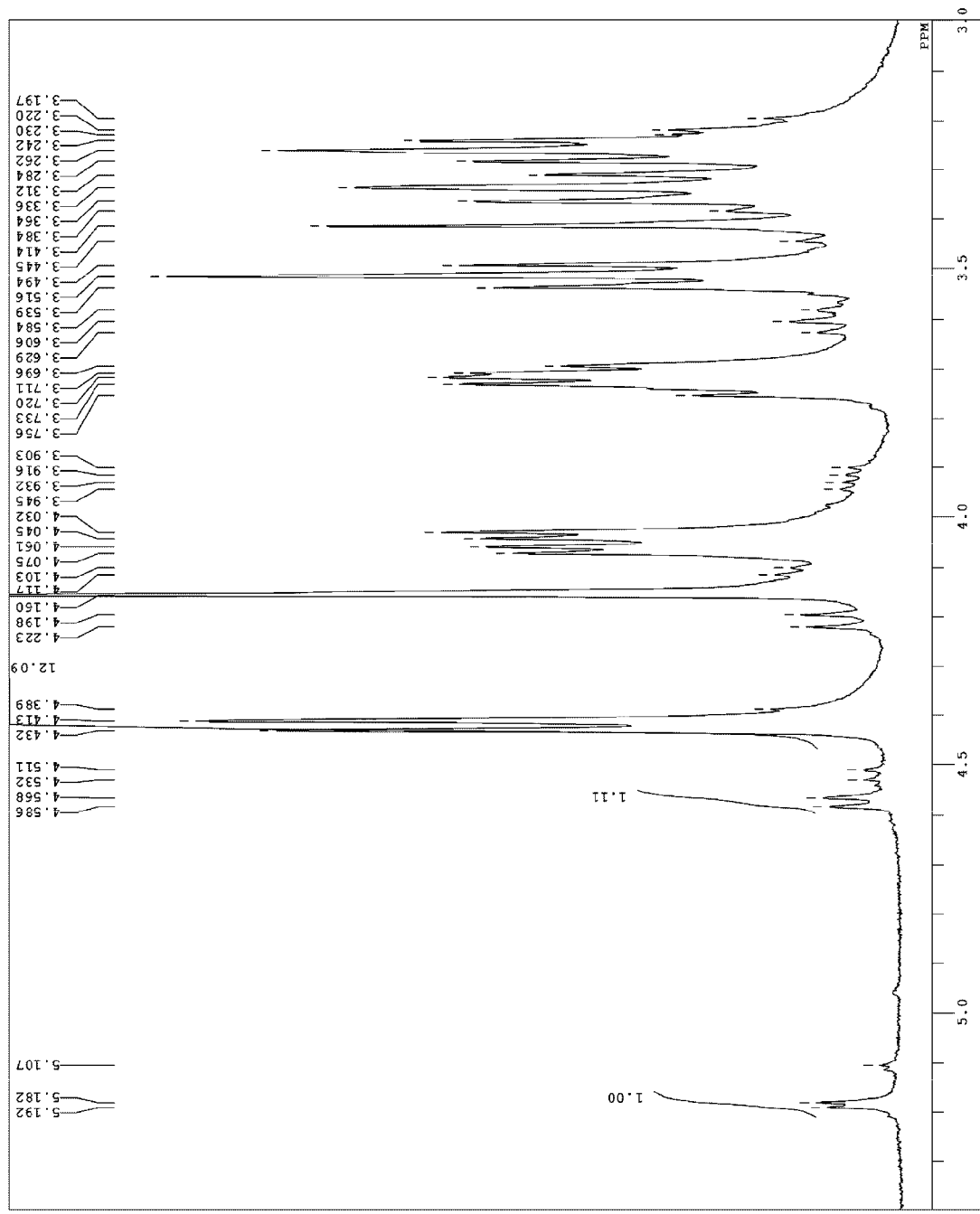
FIG. 2A is a spectrum data showing the result of $^1$H-NMR analysis of the water-soluble xylan obtained in Preparative Example 1. Measurement conditions for FIG. 2A were as follows: Analyzer: JNM-AL400 manufactured by JOEL Ltd.; measurement frequency, 400 MHz; measurement temperature, 80° C.; and solvent, $D_2O$.
Figure 2B:
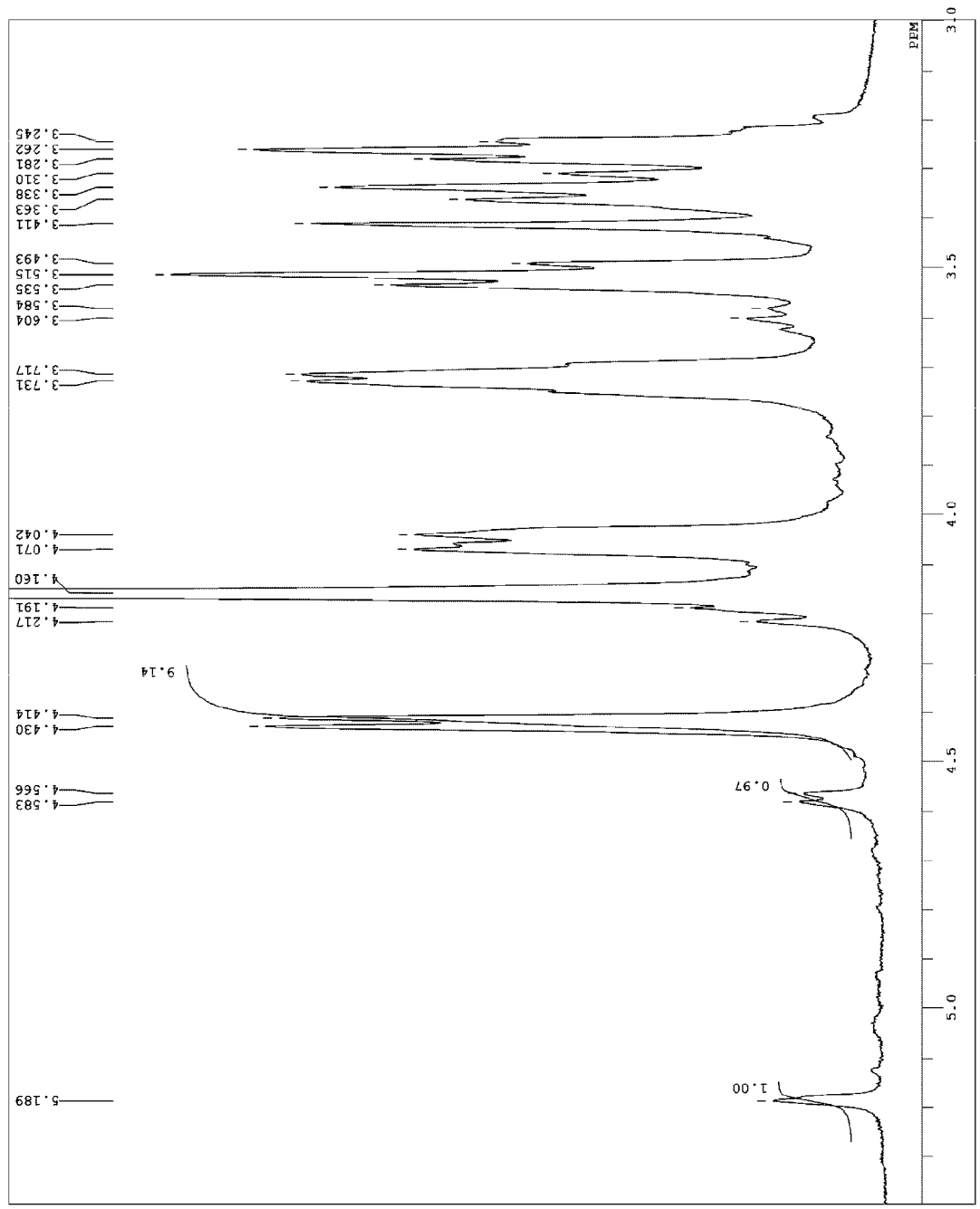
FIG. 2B is a spectrum data showing the result of $^1$H-NMR analysis of a commercially available glucuronoxylan. Measurement conditions for FIG. 2B were as follows: Analyzer: JNM-AL400 manufactured by JOEL Ltd.; measurement frequency, 400 MHz; measurement temperature, 80° C.; and solvent, $D_2O$.

The water-soluble xylan obtained (Preparative Example 1) and the glucuronoxylan used in Example 1-1 were subjected to $^1$H-NMR analysis. In the $^1$H-NMR analysis, the sample was dissolved in heavy water at a concentration of 5.0% by weight, and measured at 80° C. Results are shown in FIGS. 2A and 2B. FIG. 2A shows the results of the water-soluble xylan obtained in Preparative Example 1, while FIG. 2B shows the results of the glucuronoxylan used in Example 1-1. The values of chemical shifts of the detected peaks of the water-soluble xylan in Preparative Example 1 are consistent with those detected with the glucuronoxylan used in Example 1-1. Thus, it was found that the water-soluble xylan contained in the commercially available powdery cellulose was a glucuronoxylan and that it was not acetylated. In FIG. 2A, the peak at around 5.2 ppm indicates the peak of the hydrogen atom bound to a carbon at the position 1 of the 4-O-methyl-D-glucuronic acid residue; the doublet peak at around 4.6 ppm indicates the peak of the hydrogen atom bound to the carbon at the position 1 of the xylose residue to which 4-O- methyl-D-glucuronic acid is bound; and the doublet peak at around 4.4 ppm indicates the peak of the hydrogen atom bound to the carbon at the position 1 of the xylose residue. Accordingly, it is possible to determine the molar ratio of the 4-O-methyl-D-glucuronic acid residue to the xylose residue constituting the water-soluble xylan, by determining (area of the peak at around 5.2 ppm):(area of the doublet peak at around 4.6 ppm)+(area of the doublet peak at around 4.4 ppm). As measured the ratio of these areas in FIG. 2A, it was found that, in the water-soluble xylan obtained from the commercially available cellulose, xylose residues: 4-O-methyl-D-glucuronic acid residues=14:1.

Further, the water-soluble xylan was hydrolyzed by heating the water-soluble xylan in 2.5 M trifluoroacetic acid at 100° C. for 6 hours, and the resulting monosaccharides were confirmed by HPLC (column: CarboPac PA-1 manufactured by Dion ex; eluent: water; post-column solution: 300 mM NaOH; detector: PED-II manufactured by Dion ex). As a result, almost no arabinose (0.2-0 or less of total saccharides) was detected. Thus, it was found that the water-soluble xylan obtained in Preparative Example 1 contained substantially no arabinose.

Example 1-2

Preparation of Carbon Nanotube Solution

To 10 L of the water-soluble xylan solution prepared by Preparative Example 1, 5 g of a single-layer carbon nanotube powder (SWCNT-1 manufactured by Shenzhen Nanotech Port Co., Ltd.) was added and then stirred. The mixture was sequentially applied ultra sound by an ultra sound dispersing machine (Model UH-600SR, HO-F36 flanged chip, RD-36 continuous holder; manufactured by SMT Co., Ltd.) at a room temperature (15° C. to 20° C.) for 90 minutes at a flow rate of 1 L/min to dissolve and disperse the carbon nanotube. The obtained solution was centrifuged at 2,200×g for 15 minutes, and then the supernatant was collected. The supernatant was a blackish solution. The obtained blackish solution had an absorbance at 500 nm of 1.5 and contained about 56 µg/mL of the carbon nanotube. The obtained carbon nanotube solution was concentrated to about 1 L with a hollow fiber membrane (MICROZA MF PMP-102 manufactured by Asahi Kasei Corporation).

The concentrated solution was centrifuged at 70,000×g for 10 minutes to collect the carbon nanotube as a precipitate. To the obtained precipitate, 150 mL of the aforementioned water-soluble xylan aqueous solution was added, and the carbon nanotube was dispersed by applying an ultra sound at a room temperature (15° C. to 20° C.) for 5 minutes with a bath type sonicator (Branson 1200). The obtained blackish solution had an absorbance at 500 nm of 54 and contained about 2.0 mg/mL of the carbon nanotube.

Figure 3:
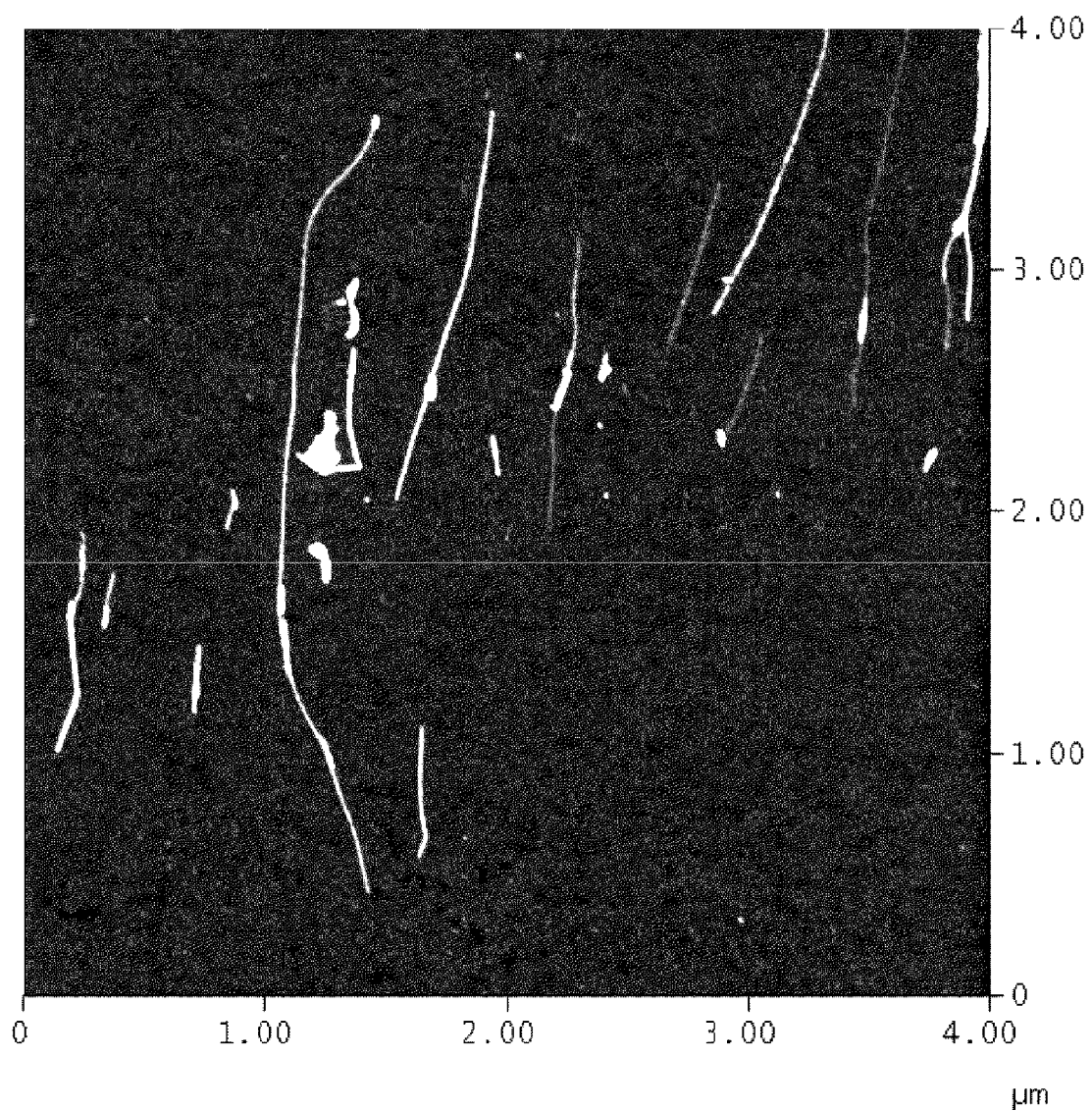
FIG. 3 is an atomic force microscopy image of carbon nanotubes dispersed into a carbon nanotube solution obtained by using a solution of commercially available powdery cellulose extracted with water. The white parts are the carbon nanotubes, and the black parts are the surface of a silicon wafer which is a sample board.

The obtained solution was observed with an atomic force microscope, and it was observed that the single-layer carbon nanotube having an outer diameter of 1.1 to 2.7 nm and a length of 0.3 to 4.0 µm is dispersed as a single molecule in the solution (FIG. 3).

Example 2-1

Comparison between Water-Soluble Xylan with Other Saccharides

A solubilizing capability of the water-soluble xylan was compared with those of other saccharides. As the water-soluble xylan, glucuronoxylan (manufactured by Institute of Chemistry, Slovak Academy of Sciences; the number average molecular weight: 18,000; xylose residue: 4-O-methyl-D-glucuronic acid reside=10:1; no acetylation) was used. For comparison, various saccharide solutions of amylose (the number average molecular weight of 2,900), pectin (derived from citrus fruit), polygalacturonic acid, methylcellulose, fucoidan, xanthan gum, carboxymethyl cellulose, an *Abelmoschus manihot* extraction liquid, a *Hydrangea paniculata* extraction liquid, gum arabic, β-1,3-glucan (schizophyllan, curdlan), and xylo-oligosaccarides (polymerization degrees of 2 and 5) were used.

To 1 mL of each of the saccharide aqueous solutions, about 4 mg of the single layer carbon nanotube powder (SWCNT-1 manufactured by Shenzhen Nanotech Port Co., Ltd.) was added and then stirred for about 10 seconds with a Vortex mixer. The mixture was applied ultra sound with a bath type sonicator (UT-205 manufactured by Sharp Corporation) at a room temperature (15° C. to 20° C.) for 5 minutes to dissolve the carbon nanotube. The obtained solution was centrifuged at 2,200×g for 10 minutes, and then the supernatant thereof was collected. The amount of the dissolved carbon nanotube was estimated by measuring the absorbance of the supernatant at 500 nm. The saccharides vary from one another in solubility to water. The saccharide solutions having concentrations as shown in Table 1 were used.

As a result, at the investigated concentration, the amount of the solubilized carbon nanotube was largest when using the water-soluble xylan. Solubilization of the carbon nanotube close to that when using the water-soluble xylan was observed when using pectin, polygalacturonic acid, fucoidan, xanthan gum, carboxymethyl cellulose or gum arabic. On the other hand, xylo-oligosaccharides (polymerization degrees of 2 and 5) which are xylan having no substituent group did not exhibit solubilization of carbon nanotube at all.

TABLE 1

| Saccharides | mg/mL | A500 |
|---|---|---|
| Water-soluble Xylan | 0.40 | 10.70 |
| Amylose | 5.00 | 0.02 |
|  | 10.00 | 0.06 |
| Pectin | 2.50 | 3.48 |
|  | 10.00 | 6.28 |
| Polygalacturonic Acid | 1.90 | 2.18 |
|  | 2.70 | 5.26 |
| Methylcellulose | 1.00 | 0.16 |
|  | 2.00 | 0.80 |
| Fucoidan | 2.50 | 1.33 |
|  | 10.00 | 6.80 |
| Xanthan Gum | 1.00 | 2.79 |
|  | 2.00 | 6.91 |
| Carboxy Methylcellulose | 2.50 | 5.64 |
|  | 10.00 | 2.37 |
| *Hydrangea Paniculata* Extraction Liquid | 0.28 | 1.06 |
|  | 0.55 | 1.22 |
| *Abelmoschus manihot* extraction liquid | 0.03 | 0.84 |
|  | 0.16 | 2.08 |
| Gum arabic | 1.00 | 0.73 |
|  | 10.00 | 4.30 |
| Schizophyllan | 0.40 | 0.95 |
|  | 0.20 | 0.12 |
| Curdlan | 0.40 | 0.02 |
| Xylo-Oligosaccharide (degree of polymerization 2) | 16 | 0.00 |
| Xylo-Oligosaccharide (degree of polymerization 5) | 5 | 0.00 |

Example 2-2

Comparison 2 Between Water-Soluble Xylan with Other Saccharides

Figure 4:
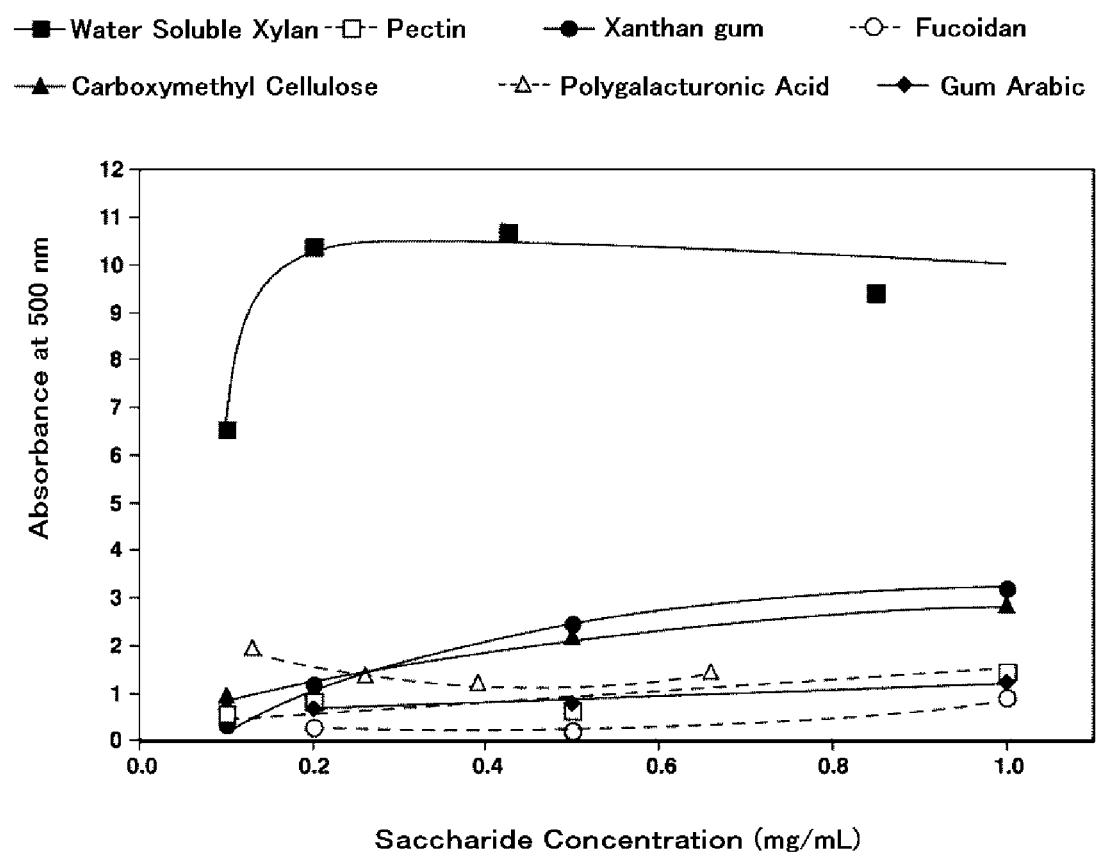
FIG. 4 is a graph showing glucan concentration dependencies of each amount of the carbon nanotube dissolved in various saccharide solutions.

Saccharide concentration dependencies of the carbon nanotube solubilizing capability were examined for pectin, polygalacturonic acid, fucoidan, xanthan gum, carboxymethyl cellulose and gum arabic, that exhibited the carbon nanotube solubilizing capability close to that of the water-soluble xylan in Example 2-1. Results are shown in FIG. 4. The water-soluble xylan showed the maximum absorbance at 500 nm at the concentration of 0.2 mg/mL, and the absorbance at 500 nm was almost not changed when the concentration of the water-soluble xylan was increased further. Within the same concentration range, the absorbances at 500 nm of the solutions containing another saccharide were 3 or less. From these results, it can be understood that the lowest concentration of the water-soluble xylan is capable of dissolving the carbon nanotube.

Example 3-1

Preparation of Carbon Nanotube-Containing Amylose Film

To 100 mL of the water-soluble xylan solution prepared in Preparative Example 1, 0.4 g of the single layer carbon nanotube powder (SWCNT-1 manufactured by Shenzhen Nanotech Port Co., Ltd.) was added and then stirred for about 10 seconds with a Vortex mixer. The mixture was applied ultra sound with a bath type sonicator (UT-205 manufactured by Sharp Corporation) at a room temperature (15° C. to 20° C.) for 5 minutes to dissolve the carbon nanotube. The obtained solution was centrifuged at 2,200×g for 10 minutes, and then collected the supernatant. The obtained blackish solution had an absorbance at 500 nm of 3.07 and contained about 164 µg/mL of the carbon nanotube.

80 mL of a distilled water was heated to 80° C., and then 0.8 g of enzymatically synthesized amylose (weight average molecular weight of 1,000,000) was gradually added to the distilled water to be dissolved. The solution was further heated with stirring and then concentrated to be a volume of about 50 mL. To 15 mL of the enzyme synthesis amylose solution, 1.5 mL of the carbon nanotube solution prepared as described above was added and heated with stirring for 10 minutes. The solution was poured into a plastic petri dish and dried at 60° C. overnight to obtain a film of an enzymatically synthesized amylose containing carbon nanotube. This film consists of 0.24 g of enzymatically synthesized amylose, 0.75 mg of water-soluble xylan, and 0.25 mg of the carbon nanotube. Therefore, the content of the carbon nanotube in the film was 0.10% by weight.

Example 3-2

Preparation of Carbon Nanotube-Containing Polyvinyl Alcohol Film 80 mL of a distilled water was heated to 80° C., and then 0.8 g of polyvinyl alcohol (polymerization degree: about 2,000) was gradually added to the distilled water to be dissolved. The solution was further heated with stirring and then concentrated to be the volume of about 50 mL. To 15 mL of this polyvinyl alcohol solution, 1.5 mL of the carbon nanotube solution prepared in the same manner as in Example 3-1 was added and then heated with stirring for 10 minutes. The solution was poured into a plastic petri dish and dried at 60° C. overnight to obtain a carbon nanotube-containing polyvinyl alcohol film. This film consists of 0.24 g of polyvinyl alcohol, 0.75 mg of the water-soluble xylan, and 0.25 mg of the carbon nanotube. Therefore, the content of the carbon nanotube in the film was 0.10% by weight.

Example 3-3

Preparation of Carbon Nanotube-Containing Pullulan Film 80 mL of a distilled water was heated to 80° C., and then 0.8 g of pullulan (molecular weight of about 200,000) was gradually added to the distilled water to be dissolved. The solution was further heated with stirring and then concentrated to be the volume of about 50 mL. To 15 mL of the pullulan solution, 1.5 mL of the carbon nanotube solution prepared as described in Example 3-1 was added and heated with stirring for 10 minutes. The solution was poured into a plastic petri dish and dried at 60° C. overnight to obtain a film of a carbon nanotube-containing pullulan film. This film consists of 0.24 g of pullulan, 0.75 mg of the water-soluble xylan, and 0.25 mg of the carbon nanotube. Therefore, the content of the carbon nanotube in the film was 0.10% by weight.

Example 4

Solubilization of Multilayer Carbon Nanotube

As water-soluble xylan, glucuronoxylan (manufactured by Institute of Chemistry, Slovak Academy of Sciences; the number average molecular weight of 18,000; xylose residue: 4-O-methyl-D-glucuronic acid reside=10:1; no acetylation) was used. As a multilayer carbon nanotube, multilayer carbon nanotubes that are different in outer diameter and length from one another, S-MWCNT-10 (outer diameter of 10 nm or less, length of 1 to 2 µm, purity of 95% or more); L-MWCNT-10 (outer diameter of 10 nm or less, length of 5 to 15 µm, purity of 956 or more); S-MWCNT-60100 (outer diameter of 60 nm or less, length of 1 to 2 µm, purity of 95% or more); L-MWCNT-60100 (outer diameter of 60 nm or less, length of 5 to 15 µm, purity of 956 or more) (all of which are manufactured by Shenzhen Nanotech Port Co., Ltd.) were used.

Figure 5:
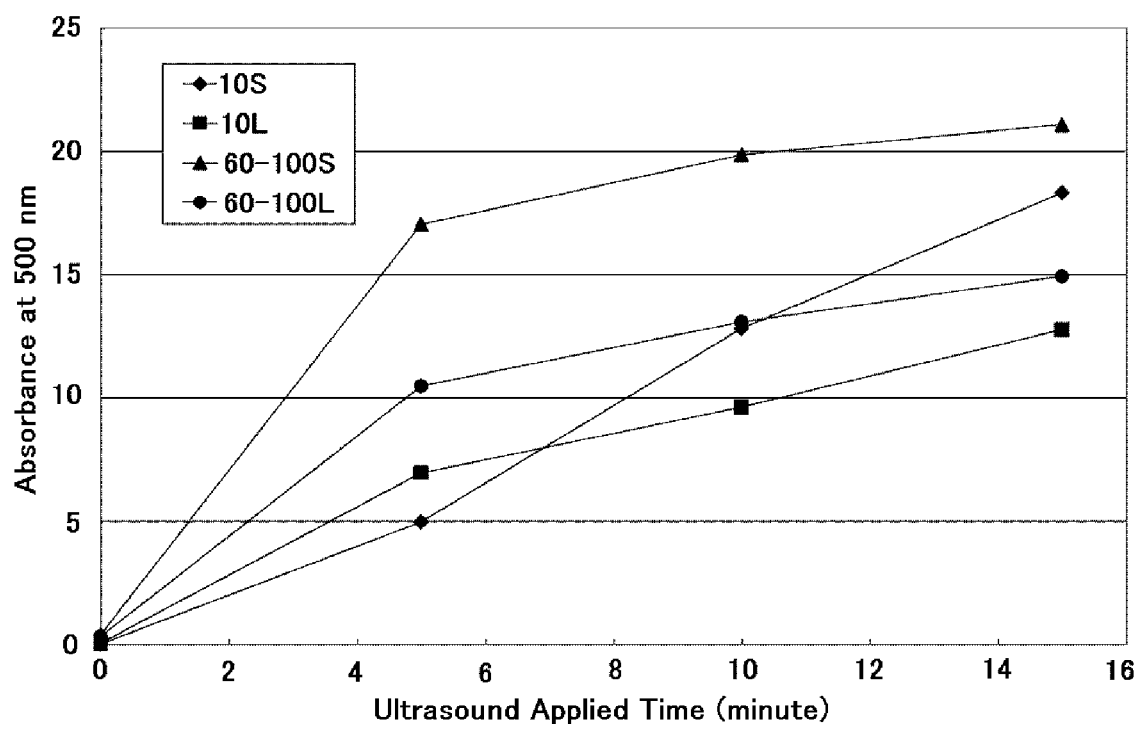
FIG. 5 is a graph showing the relationship between the amount of multilayer carbon nanotubes dissolved in a water-soluble xylan solution and an ultra sound application time. The correspondence between the kind of the multilayer carbon nanotubes and the legends are as follows: 10S: S-MWCNT-10; 10L: L-MWCNT-10; 60-100S: S-MWCNT-60100; 60-100L: L-MWCNT-60100.

To 15 mL of a 0.4 mg/mL glucuronoxylan aqueous solution, 15 mg of the multilayer carbon nanotube powder was added, and then stirred with a Vortex mixer. The mixture was applied ultra sound by an ultra sound dispersing machine (Model US-300T, chip diameter of 7 mm, manufactured by NIHONSEIKI KAISHA Ltd.) at a room temperature (15° C. to 25° C.) for 5 minutes for three times to dissolve and disperse the carbon nanotube. The obtained solution was centrifuged at 2,200×g for 10 minutes, and then absorbance at 500 nm of the supernatant was measured. The supernatant was a blackish solution (FIG. 5). With each of the multilayer carbon nanotubes, the absorbance at 500 nm was increased along with an increase in ultra sound application time. After 15 minutes of the ultra sound application, each of the carbon nanotubes was dispersed in an amount of about 6.5 mg (10S), about 4.5 mg/mL (10L), about 7.5 mg (60-100S), about 5.3 mg (60-100L). As described above, it was possible to obtain a solution by solubilizing each of the multilayer carbon nanotubes by using the water-soluble xylan, irrespective of the outer diameter and the length of the multilayer carbon nanotube.

Preparative Example 2

Preparation of Water-Soluble Xylan Aqueous Solution

To 600 g of a commercially available powdery cellulose produced from wood pulp (KC Flock of Nippon Paper Chemicals Co., Ltd.), 20 L of water was added and stirred at room temperature for 30 minutes. The solution was filtered sequentially through filter paper, 0.45 μm filter, and 0.2 μm filter, and the filtrate was recovered. Thus obtained solution was concentrated about 10 times with a rotary evaporator to obtain a water-soluble xylan aqueous solution. As measured by a phenol sulfuric acid method, the 10 times concentrated solution contained about 8.0 mg/mL of the water-soluble xylan.

Example 5 and Comparative Example 1

Non-Stickiness Improvement in Cooked Rice by Addition of Water-Soluble Xylan Before Cooking To 100 parts by weight of rice, 60 parts by weight of water and 60 parts by weight of the water-soluble xylan aqueous solution prepared in Preparative Example 2 were added, and then cooked with a rice cooker for home-use (electronic jar rice cooker; SR-CF05 manufactured by Matsushita Electronic Industrial Co., Ltd.) to obtain 230 parts by weight of a cooked rice (containing 0.2% by weight of the water-soluble xylan). This was used as a sample (Example 5). The Cooked rice obtained by cooking in the same manner as described above except for adding 120 parts by weight of water to 100 parts by weight of rice was used as Comparative Sample (Comparative Example 1). After the cooking of the sample and the comparative sample, each of them was placed in a plastic container, allowed to cool at a room temperature for 2 hours, closed the container with the lid, and allowed to stand at 4° C. for 18 hours. After that, sensory evaluation of degrees of non-stickiness using a rice scoop by 10 panelists was performed. As a result, all of 10 panelists answered that cooked rice of Example 5 was better in non-stickiness as compared to those of Comparative Example 1.

Example 6 and Comparative Example 2

Non-Stickiness Improvement in Cooked Rice by Addition of Water-Soluble Xylan after Cooking Rice was cooked by an ordinary method to obtain a cooked rice. Five parts by weight of the aqueous solution that was obtained by concentrating 10 times the water-soluble xylan solution prepared in Preparative Example 2 by a rotary evaporator was sprayed to 100 parts by weight of the cooked rice at about 80° C. after completion of heating of cooking, uniformly mixed to obtain a sample (Example 6). This cooked rice contained about 0.4% by weight of the water-soluble xylan. The cooked rice obtained by spraying 5.0 parts by weight of water to 100 parts by weight of the cooked rice and uniformly mixing was used as a comparative sample (Comparative Example 2). Each of the sample and the comparative sample was placed in a plastic container, allowed to cool at a room temperature for 2 hours, closed the container with a lid, and allowed to stand at 4° C. for another 16 hours. After that, sensory evaluation of degrees of non-stickiness using a rice scoop by 10 panelists was performed. As a result, 8 panelists answered that cooked rice of Example 6 was better in non-stickiness as compared to those of Comparative Example 2.

Example 7 and Comparative Example 3

Non-Stickiness Improvement in Boiled Noodle by Addition of Water-Soluble Xylan after Producing Boiled Noodle A commercially available dried Japanese wheat noodle was boiled to be 300% of water absorption yield, cooled with running water to 10° C., and the water was discarded to obtain a boiled noodle. 5 parts by weight of the aqueous solution that was obtained by concentrating 10 times the water-soluble xylan solution prepared in Preparative Example 2 by a rotary evaporator was sprayed to 100 parts by weight of the boiled noodle, and uniformly mixed to obtain a sample (Example 7). This boiled noodle contained about 0.4% by weight of the water-soluble xylan. The Boiled noodle obtained by spraying 5 parts by weight of water to 100 parts by weight of the boiled noodle and uniformly mixing was used as a comparative sample (Comparative Example 3). Each of the sample and the comparative sample was placed in a plastic container, and allowed to stand at 4° C. for 16 hours. After that, sensory evaluation of degrees of non-stickiness boiled noodle by 10 panelists was performed. As a result, 8 panelists answered that the boiled noodle of Example 7 was better in non-stickiness as compared to those of Comparative Example 3.

Example 8 and Comparative Example 4

Taste Improvement in Tea Beverage by Water-Soluble Xylan

To 100 parts by weight of a commercially available tea beverage, 20 parts by weight of the water-soluble xylan aqueous solution prepared in Preparative Example 2 (Example 8) or water (Comparative Example 4) was added to obtain a sample (Example 8) and a comparative sample (Comparative Example 4). Sensory evaluation by 10 panelists was performed on each of the sample and the comparative sample. As a result 9 panelists answered that the sample (i.e. the water-soluble xylan added sample) was alleviated in bitterness as compared to those of Comparative Example 4.

As described above, the present invention has been exemplified using a preferred embodiment of the present invention, but the present invention should not be construed to be limited to this embodiment. It is understood that the present invention should be construed for its scope only by the claims. It is understood that those skilled in the art can practice an equivalent range based on the description of the invention and the technical common knowledge, from the description of the specific preferable embodiment of the present invention. It is understood that patents, patent applications and publications cited in the present specification are herein incorporated by reference for the content thereof as if the contents themselves were specifically described in the present specification.

INDUSTRIAL APPLICABILITY

It is possible to solubilize a hardly soluble or insoluble substance by using the water-soluble xylan at concentration that is lower than the concentrations of conventional solubilizing agents. Therefore, it is possible to use the hardly soluble or insoluble useful substance that is limited in application due to a problem of solubilization, as a solution or a molded article. Also, the low concentration of the solubilizing agent serves to make for widening of a range of selection of substances to be used for molded article formation.

With the use of the water-soluble xylan, it is possible to provide a processed grain food that is capable of maintaining preferable physical properties such as a color, glossiness, and non-stickiness that are achieved immediately after the cooking or processing for a long time after the production. Such processed grain foods are almost free from physical property deterioration with age, such as a change in color, loss of surface glossiness, and an increase in adhesiveness resulting in sticking and are considerably useful in restaurant industry and general household.

According to the method of the present invention, in the case of a carbon nanotube is solubilized, it is possible to obtain a solution and a molded article in which the carbon nanotube is uniformly dispersed. Therefore, it is possible to utilize the carbon nanotube in the field where the carbon nanotube has not been used, such as the fields of cosmetics, medicines, and foods.

With the use of the water-soluble xylan, it is possible to improve a taste of a hardly soluble or insoluble substance that has a useful function such as a bioactive function but has not been orally taken in a large amount due to the taste. Therefore, by using the method of the present invention, it is possible to use a larger amount of such substance as compared to conventional methods, and it is possible to exert higher function.

The invention claimed is:

1. A solution comprising an added water-soluble xylan, wherein the water-soluble xylan is a molecule having six or more xylose residues connected to each other by β-1,4 bonds and is capable of dissolving in water at 20° C. at a concentration of at least 6 mg/mL, a substance, and a solvent, wherein only less than about 10 g of the substance can be dissolved in 1 L of the solvent in the absence of the water-soluble xylan, wherein said substance is a carbon nanotube, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan.

2. The solution according to claim 1, wherein said carbon nanotube is a single-layer carbon nanotube.

3. The solution according to claim 1, wherein said solvent is water.

4. The solution according to claim 1, wherein the concentration of the carbon nanotube is 50 mg/L or more.

5. The solution according to claim 1, wherein the concentration of the carbon nanotube is 1 g/L or more.

6. A solution comprising an added water-soluble xylan, wherein the water-soluble xylan is a molecule having six or more xylose residues connected to each other by β-1,4 bonds and is capable of dissolving in water at 20° C. at a concentration of at least 6 mg/mL, a substance, and a solvent, wherein only less than about 10 g of the substance can be dissolved in 1 L of the solvent in the absence of the water-soluble xylan, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan, wherein said water-soluble xylan is derived from woody plants.

7. The solution according to claim 6, wherein said water-soluble xylan is derived from hardwood.

8. The solution according to claim 6, wherein said substance is a carbon nanotube.

9. A molded article comprising an added water-soluble xylan, wherein the water-soluble xylan is a molecule having six or more xylose residues connected to each other by beta-1,4 bonds and is capable of dissolving in water at 20° C. at a concentration of at least 6 mg/mL; and a substance; wherein only less than about 10 g of the substance can be dissolved in 1 L of a solvent in the absence of the water-soluble xylan, wherein said substance is a carbon nanotube, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan.

10. The molded article according to claim 9, wherein said carbon nanotube is a single-layer carbon nanotube.

11. The molded article according to claim 9, wherein said molded article is molded from a material comprising a solution in which the solvent of the solution is water alone.

12. The molded article according to claim 9, wherein said molded article is a film or a fiber.

13. The molded article according to claim 9, wherein said molded article is a drawn film.

14. A molded article comprising an added water-soluble xylan, wherein the water-soluble xylan is a molecule having six or more xylose residues connected to each other by beta-1,4 bonds and is capable of dissolving in water at 20° C. at a concentration of at least 6 mg/mL, and a substance; wherein only less than about 10 g of the substance can be dissolved in 1 L of the solvent in the absence of the water-soluble xylan, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan, wherein said water-soluble xylan is derived from woody plants.

15. The molded article according to claim 14, wherein said water-soluble xylan is derived from hardwood.

16. The molded article according to claim 14, wherein said substance is a carbon nanotube.

17. A gel comprising an added water-soluble xylan, wherein the water-soluble xylan is a molecule having six or more xylose residues connected to each other by beta-1,4 bonds and is capable of dissolving in water at 20° C. at a concentration of at least 6 mg/mL, and a substance; wherein only less than about 10 g of the substance can be dissolved in 1 L of a solvent in the absence of the water-soluble xylan, wherein said substance is a carbon nanotube, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan.

18. A solution obtained from a method, wherein the method comprises:
bringing a substance into contact with a water-soluble xylan and a solvent,
wherein only less than about 10 g of the substance can be dissolved in 1 L of the solvent in the absence of the water-soluble xylan, wherein said substance is a carbon nanotube, wherein the water-soluble xylan is a molecule having six or more xylose residues connected to each other by β-1,4 bonds and is capable of dissolving in water at 20° C. at a concentration of at least 6 mg/mL, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan.

19. The solution according to claim 18, wherein said carbon nanotube is a single-layer carbon nanotube.

20. The solution according to claim 18, wherein said solvent is water.

21. The solution according to claim 18, wherein the concentration of the carbon nanotube is 50 mg/L or more.

22. The solution according to claim 18, wherein the concentration of the carbon nanotube is 1 g/L or more.

23. A solution obtained from a method, wherein the method comprises:
bringing a substance into contact with a water-soluble xylan and a solvent,
wherein only less than about 10 g of the substance can be dissolved in 1 L of the solvent in the absence of the water-soluble xylan,
wherein the water-soluble xylan is a molecule having six or more xylose residues connected to each other by β-1,4 bonds and is capable of dissolving in water at 20° C. at a concentration of at least 6 mg/mL, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan
wherein said water-soluble xylan is derived from woody plants.

24. The solution according to claim 23, wherein said water-soluble xylan is derived from hardwood.

25. The solution according to claim 23, wherein said substance is a carbon nanotube.

26. A molded article obtained from a method, wherein the method comprises:
bringing a substance into contact with a water-soluble xylan and a solvent to form a solution,
wherein only less than about 10 g of the substance can be dissolved in 1 L of the solvent in the absence of the water-soluble xylan, wherein said substance is a carbon nanotube,
wherein the water-soluble xylan is a molecule having six or more xylose residues connected to each other by beta-1,4 bonds and is capable of dissolving in water at 20° C. at a concentration of at least 6 mg/mL, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan, and
molding the solution to form the molded article.

27. The molded article according to claim 26, wherein said carbon nanotube is a single-layer carbon nanotube.

28. The molded article according to claim 26, wherein the solvent is water.

29. The molded article according to claim 26, wherein said molded article is a film or a fiber.

30. The molded article according to claim 26, wherein said molded article is a drawn film.

31. A molded article obtained from a method, wherein the method comprises:
bringing a substance into contact with a water-soluble xylan and a solvent to form a solution,
wherein only less than about 10 g of the substance can be dissolved in 1 L of the solvent in the absence of the water-soluble xylan,
wherein the water-soluble xylan is a molecule having six or more xylose residues connected to each other by beta-1,4 bonds and is capable of dissolving in water at 20° C. at a concentration of at least 6 mg/mL, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan,
wherein said water-soluble xylan is derived from woody plants, and
molding the solution to form the molded article.

32. The molded article according to claim 31, wherein said water-soluble xylan is derived from hardwood.

33. The molded article according to claim 31, wherein said substance is a carbon nanotube.

34. A gel obtained from a method, wherein the method comprises:
bringing a substance into contact with a water-soluble xylan and a solvent to form a solution,
wherein only less than about 10 g of the substance can be dissolved in 1 L of the solvent in the absence of the water-soluble xylan, wherein said substance is a carbon nanotube,
wherein the water-soluble xylan is a molecule having six or more xylose residues connected to each other by beta-1,4 bonds and is capable of dissolving in water at 20° C. at a concentration of at least 6 mg/mL, wherein the number average degree of polymerization of the main chain of said water-soluble xylan is 6 or more and 5,000 or less, wherein the number-average molecular weight of said water-soluble xylan is 7,000 or more and 1,000,000 or less, wherein said water-soluble xylan is unmodified glucuronoxylan or unmodified arabinoglucuronoxylan, and
forming a gel from the solution.

* * * * *